United States Patent
Nam et al.

(10) Patent No.: US 11,457,464 B2
(45) Date of Patent: Sep. 27, 2022

(54) CARRIER-GROUP BASED CROSS-SLOT SCHEDULING ADAPTATION

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/024,520

(22) Filed: Sep. 17, 2020

(65) Prior Publication Data

US 2021/0092760 A1   Mar. 25, 2021

Related U.S. Application Data

(60) Provisional application No. 62/903,536, filed on Sep. 20, 2019.

(51) Int. Cl.
*H04W 72/04* (2009.01)
*H04W 72/12* (2009.01)
*H04W 16/32* (2009.01)

(52) U.S. Cl.
CPC ..... *H04W 72/1289* (2013.01); *H04W 72/044* (2013.01); *H04W 16/32* (2013.01)

(58) Field of Classification Search
CPC ... H04W 16/32; H04W 72/02; H04W 72/044; H04W 72/1278; H04W 72/1289; H04L 5/0053; H04L 5/0092
See application file for complete search history.

(56) References Cited

U.S. PATENT DOCUMENTS

| | | | |
|---|---|---|---|
| 2010/0232373 A1* | 9/2010 | Nory | H04W 72/1289 370/329 |
| 2013/0012203 A1* | 1/2013 | Moulsley | H04L 5/0053 455/434 |
| 2019/0357238 A1* | 11/2019 | Zhou | H04L 5/0046 |

(Continued)

FOREIGN PATENT DOCUMENTS

WO    WO-2020121412 A1 *  6/2020

OTHER PUBLICATIONS

Huawei, "Procedure of cross-slot scheduling for UE power saving", 3GPP TSG RAN WG1 Meeting #98, R1-1908070, Prague, Czech Republic, Aug. 26-30, 2019 (Year: 2019).*

(Continued)

*Primary Examiner* — Brian P Cox
(74) *Attorney, Agent, or Firm* — Patterson & Sheridan, L.L.P

(57) ABSTRACT

Certain aspects of the present disclosure provide techniques for adapting cross-slot scheduling based on carrier groups. For example, certain aspects provide techniques for receiving a time-domain configuration comprising one or more offset values of time-domain resources relative to reception of physical downlink control channel (PDCCH), determining which at least one offset value of the one or more offset values are greater than or equal to a minimum offset value of the corresponding carrier, and for each carrier of the group of carriers, one or more of transmitting over a physical uplink shared channel (PUSCH) or monitoring a physical downlink shared channel (PDSCH).

27 Claims, 14 Drawing Sheets

(56) References Cited

U.S. PATENT DOCUMENTS

| | | | | |
|---|---|---|---|---|
| 2020/0008076 A1* | 1/2020 | Peng | .................... | H04L 5/0055 |
| 2020/0236692 A1* | 7/2020 | Lin | ..................... | H04W 72/042 |
| 2020/0374044 A1* | 11/2020 | Lei | ........................ | H04L 5/0053 |
| 2021/0050936 A1* | 2/2021 | Seo | ....................... | H04L 5/0053 |
| 2021/0314994 A1* | 10/2021 | Ang | ................. | H04W 72/1257 |
| 2021/0321446 A1* | 10/2021 | Lee | ................. | H04W 72/1257 |

OTHER PUBLICATIONS

"3rd Generation Partnership Project; Technical Specification Group Radio Access Network; NR; Radio Resource Control (RRC) protocol specification (Release 15)", 3GPP Standard, Technical Specification; 3GPP 38.331, 3rd Generation Partnership Project (3GPP), Mobile Competence Centre, 650, Route Des Lucioles; F-06921 Sophia-Antipolis Cedex; France, vol. RAN WG2, No. V15.6.0, Jun. 29, 2019, pp. 1-519, XP051754472, [retrieved on Jun. 29, 2019].

International Search Report and Written Opinion—PCT/US2020/051594—ISA/EPO—dated Nov. 27, 2020.

Qualcomm Incorporated: "Cross-slot Scheduling Power Saving Techniques," 3GPP Draft, 3GPP TSG-RAN NG1 #98, R1-1909276, Cross-slot Scheduling Power Saving Techniques, 3rd Generation Partnership Project (3GPP), Mobile Competence Centre, 650, Route Des Lucioles, F-06921, Sophia-Antipolis Cedex, France, vol. RAN WG1, No. Prague. Czech Republic, Aug. 26, 2019-Aug. 30, 2019, Aug. 17, 2019, XP051765881,16 pages, http://www.3gpp.org/ftp/tsg_ran/WG1_RL1/TSGR1_98/Docs/R1-1909276.zip [retrieved on Aug. 17, 2019].

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019, XP051593757, pp. 1-24, http://www.3gpp.org/ftp/tsg%5Fran/WG1%5FRL1/TSGR1%5FAH/NR%5FAH%5F1901/Docs/R1%2D1900911%2Ezip.

* cited by examiner

400

| Row index | $K_0$ | S | L |
|---|---|---|---|
| 1 | 0 | 3 | 11 |
| 2 | 0 | 3 | 10 |
| 3 | 1 | 3 | 10 |
| 4 | 2 | 3 | 10 |

| Row index | $K_0$ | S | L |
|---|---|---|---|
| 1 | 0 | 3 | 11 |
| 2 | 0 | 3 | 9 |
| 3 | 1 | 3 | 8 |
| 4 | 2 | 3 | 6 |

| CCs in the Group | Set 0 | Set 1 |
|---|---|---|
| CC1 | 0 | 1 |
| CC2 | 0 | 1 |
| CC3 | 0 | 2 |
| CC4 | 0 | 2 |

FIG. 8

CARRIER-GROUP BASED CROSS-SLOT SCHEDULING ADAPTATION

CROSS-REFERENCE TO RELATED APPLICATION(S)

This application claims benefit of and priority to U.S. Provisional Patent Application Ser. No. 62/903,536, filed Sep. 20, 2019, herein incorporated by reference in its entirety as if fully set forth below and for all applicable purposes.

BACKGROUND

Field of the Disclosure

Aspects of the present disclosure relate to wireless communications, and more particularly, to techniques for adjusting scheduling offset for wireless communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects relate to a method for scheduling wireless communications by a user equipment (UE). In some examples, the method includes receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the method includes, for each carrier of the group of carriers, determining which at least one offset value of the one or more offset values are greater than or equal to a minimum offset value of the corresponding carrier. In some examples, the method includes, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

Certain aspects relate to a user equipment (UE) configured for scheduling wireless communications. In some examples, the UE includes a memory, and a processor communicatively coupled to the memory. In some examples, the processor and the memory are configured to receive a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the processor and the memory are configured to, for each carrier of the group of carriers, determine which at least one offset value of the one or more offset values are greater than or equal to a minimum offset value of the corresponding carrier. In some examples, the processor and the memory are configured to, for each carrier of the group of carriers, one or more of transmit over a physical uplink shared channel (PUSCH) or monitor a physical downlink shared channel (PDSCH) utilizing time-domain resources corresponding to the at least one offset value of the one or more offset values that are greater than or equal to the minimum offset value of the corresponding carrier.

Certain aspects relate to a method for scheduling wireless communications by a base station (BS). In some examples, the method includes transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE. In some examples, the method includes transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the method includes, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

Certain aspects relate to a base station (BS) configured for scheduling wireless communications. In some examples, the BS includes a memory and a processor communicatively coupled to the memory. In some examples, the processor and the memory are configured to transmit, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE. In some examples, the processor and the memory are configured to transmit, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the processor and the memory are configured to, for each carrier of the group of carriers, one or more of transmit over a physical downlink shared channel (PDSCH) or receive over a physical uplink shared channel (PUSCH) utilizing time-domain resources corresponding to at least one offset value of the one or more offset values that are greater than or equal to a minimum offset value of the corresponding carrier.

Certain aspects relate to a user equipment (UE). In some examples, the UE comprises means for receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, for each carrier of the group of carriers, means for determining which at least one offset value of the one or more offset values are greater than or equal to a minimum offset value of the corresponding carrier. In some examples, for each carrier of the group of carriers, a means for transmitting and a means for monitoring such that the UE is configured for one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

Certain aspects relate to a non-transitory computer-readable storage medium that stores instructions that when executed by a processor of a user equipment (UE) cause the UE to perform a method for wireless communication. In some examples, the method includes receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the method includes, for each carrier of the group of carriers, determining which at least one offset value of the one or more offset values are greater than or equal to a minimum offset value of the corresponding carrier. In some examples, the method includes, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

Certain aspects relate to a base station (BS). In some examples, the BS includes means for transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE. In some examples, the BS includes means for transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the BS includes, for each carrier of the group of carriers, a means for transmitting and a means for receiving such that the BS is configured for one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

Certain aspects relate to a non-transitory computer-readable storage medium that stores instructions that when executed by a processor of a base station (BS) cause the BS to perform a method for wireless communication. In some examples, the method includes transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE. In some examples, the method includes transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH. In some examples, the method includes, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 depicts an example time-domain resource allocation table for use for a physical downlink shared channel (PDSCH), in accordance with certain aspects.

FIG. 7 depicts an example time-domain resource allocation table for use for a physical downlink shared channel (PDSCH), in accordance with certain aspects.

FIG. 8 depicts an example scheduling adaptation configuration table for use for a physical downlink shared channel (PDSCH), in accordance with certain aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
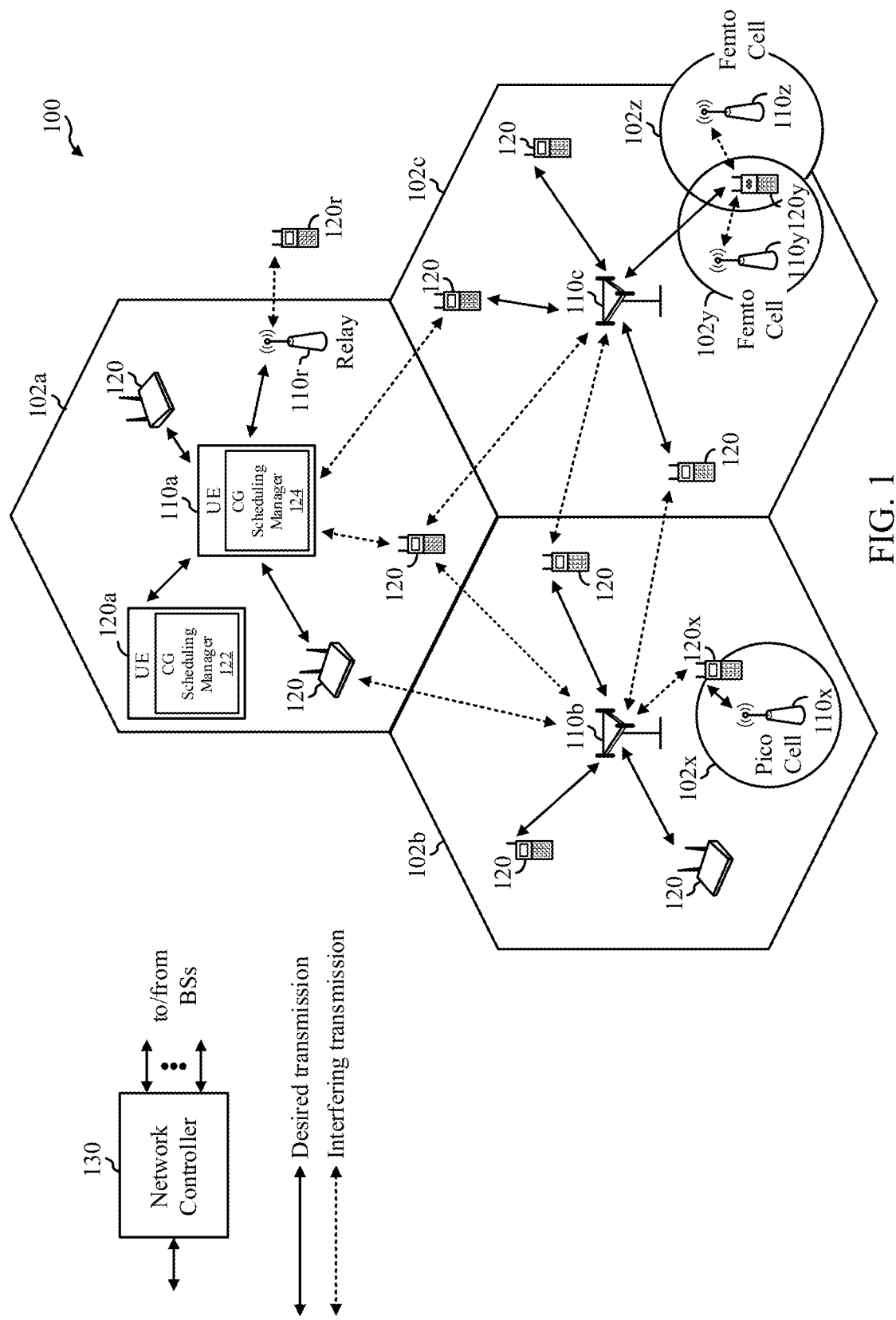
FIG. 1 is a block diagram conceptually illustrating an example telecommunications system, in accordance with certain aspects of the present disclosure.

Aspects of the present disclosure provide apparatus, methods, processing systems, and computer readable mediums for adjusting scheduling offset for wireless communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed including adjusting scheduling offset for wireless communications. For example, the wireless communication network 100 may be a New Radio (NR) or 5G network.

For example, as shown in FIG. 1, the UE 120a has a carrier group (CG) scheduling manager 122 that may be configured for receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

The CG scheduling manager 122 may also be configured for, for each carrier of the group of carriers, determining which at least one offset value of the one or more offset values are greater than or equal to a minimum offset value of the corresponding carrier. The CG scheduling manager 122 may also be configured for, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

In another example, as shown in FIG. 1, the BS 110a has a CG scheduling manager 124 that may be configured for transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE.

The CG scheduling manager 124 may also be configured for transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

The CG scheduling manager 124 may also be configured for, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

As illustrated in FIG. 1, the wireless network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a sub-band, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time-domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.8 MHz (i.e., 6 resource blocks), and there may be 1, 2, 4, 8, or 16 sub-bands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
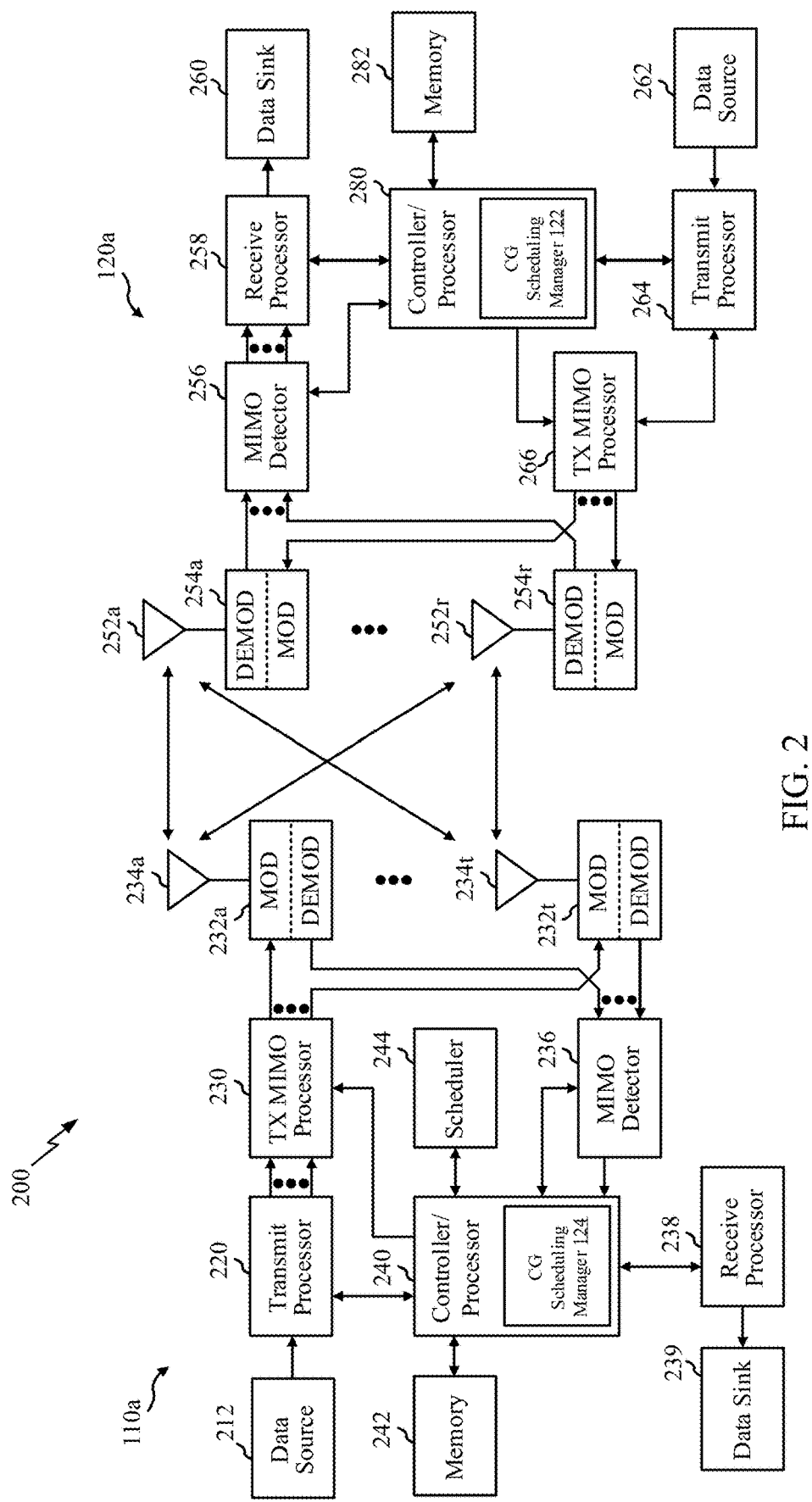
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 260, 238, and/or controller/processor 240 of the BS 110 may be used to perform the various techniques and methods described herein.

As shown in FIG. 2, the UE 120a has a processor 280 that includes a CG scheduling manager 122 that may be configured for receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

The CG scheduling manager 122 may also be configured for, for each carrier of the group of carriers, determining which at least one offset value of the one or more offset values are greater than or equal to a minimum offset value of the corresponding carrier. The CG scheduling manager 122 may also be configured for, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

As shown in FIG. 2, the BS 110a has a processor 240 that includes a CG scheduling manager 124 that may be configured for transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE.

In some examples, the CG scheduling manager 124 that may be configured for transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

In some examples, the CG scheduling manager 124 that may be configured for, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, de-interleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a includes a CG scheduling manager 122. The CG scheduling manager 122 may be configured to receive a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, each of the one or more minimum offset values corresponding to one or more carriers of a group of carriers and indicating a minimum scheduling offset indicative of a minimum number of slots offset from the reception of PDCCH.

In certain aspects, the CG scheduling manager 122 may be configured to determine, for each carrier of the group of carriers, which at least one offset value of the one or more offset values are greater than or equal to a minimum offset value of the corresponding carrier. The CG scheduling manager 122 may also monitor, for each carrier of the group of carriers, a physical downlink shared channel (PDSCH) at time-domain resources corresponding to the at least one offset value of the one or more offset values that are greater than or equal to the minimum offset value of the corresponding carrier, in accordance with aspects of the present disclosure. Although shown at the Controller/Processor, other components of the UE 120a and BS 110a may be used performing the operations described herein.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
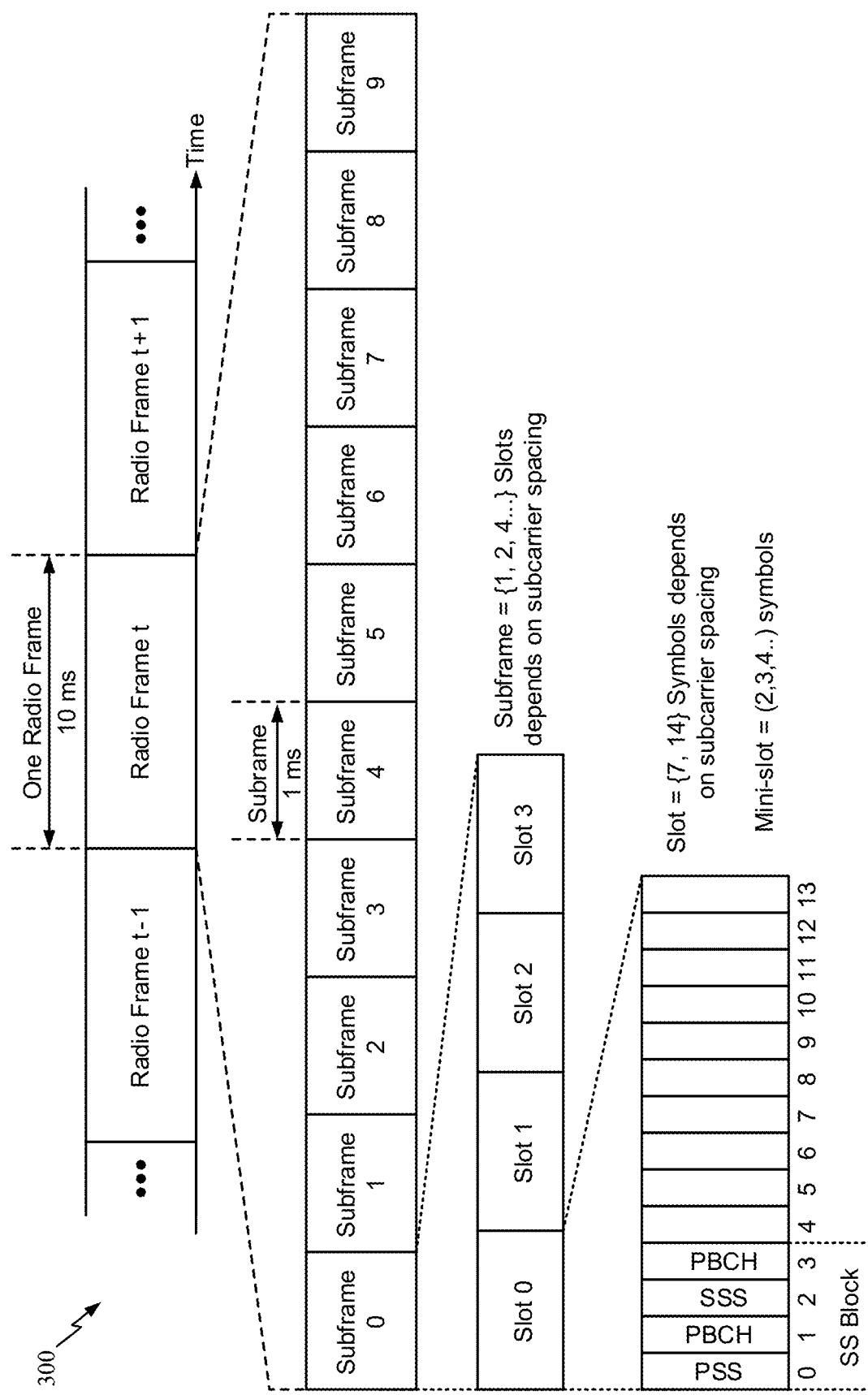
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access node (AN), or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Adjusting Scheduling Offset for Wireless Communications

Certain communications in a wireless network, such as wireless network 100 of FIG. 1 may be scheduled. For example, a BS (e.g., BS 110 of FIG. 1) may send scheduling information (e.g., DL allocation and/or UL grant in downlink control information (DCI)) indicative of parameters (e.g., time-domain resources and/or frequency domain resources) to a UE (e.g., UE 120 of FIG. 1) for communicating (e.g., on the downlink such as in a physical downlink shared channel (PDSCH) and/or on an uplink such as in a physical uplink shared channel (PUSCH)) with the BS. In certain aspects, the BS 110 sends the scheduling information in a physical downlink control channel (PDCCH) to the UE 120. In one example, BS 110 sends DL allocation indicative of parameters for the UE 120 to use to receive data on the PDSCH from the BS 110. In another example, BS 110 sends an UL grant indicative of parameters for the UE 120 to use to transmit data on the PUSCH to the BS 110.

Figure 4:
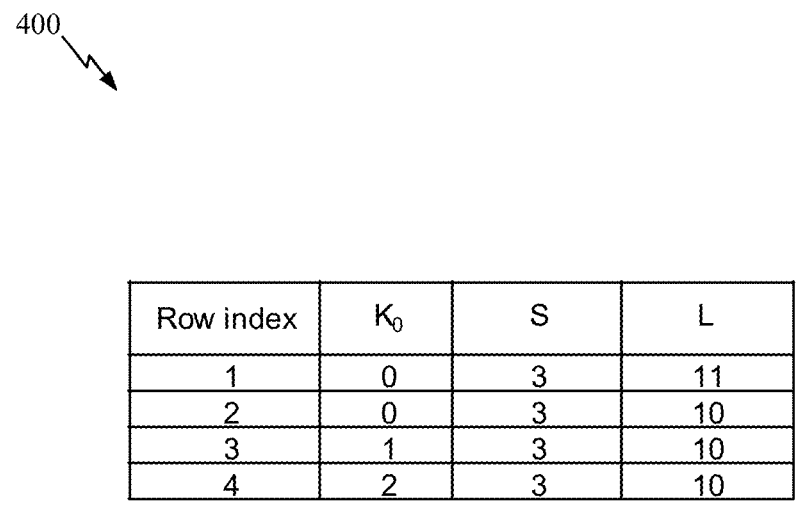

In certain aspects, the UE 120 is configured with one or more time-domain resource allocation tables, such as according to 3GPP Specification 38.214 version 15.2.0 (e.g., sections 5.1.2.1 and 6.1.2.1). FIG. 4 depicts an example time-domain resource allocation table 400 for use for a PDSCH. It should be noted that UE 120 may be configured with a similar time-domain resource allocation table for use for a PUSCH, may be configured with a single time-domain resource allocation table for use for both the PDSCH and PUSCH, etc.

As shown, the time-domain resource allocation table 400 includes columns corresponding to a row index and scheduling parameters including a scheduling offset (e.g., $k_0$ for PDSCH or $k_2$ for PUSCH), a starting symbol index (S), and a number of symbols (L). Each row of table 400 corresponds to an entry of table 400. In certain aspects, table 400 includes up to 16 rows. Further, each row is indexed by its row index value.

In certain aspects, the scheduling information sent by BS 110 in the PDCCH to UE 120 includes a row index value. The UE 120 is further configured to utilize the row index value to select a row of table 400, and use the scheduling parameters in the selected row to determine time-domain resources to utilize for communication with the BS 110, such as on the PDSCH and/or PUSCH corresponding to the PDCCH.

The scheduling offset indicates a number of slots offset from the reception of the PDCCH including the scheduling information by the UE 120. The UE 120 is configured to utilize the scheduling offset to determine a slot to use for communicating (e.g., for receiving the PDSCH or transmitting the PUSCH) with the BS 110 relative to the slot in which the PDCCH is received. For example, if the UE 120 receives the PDCCH in slot n indicating a row index and DL allocation corresponding to a PDSCH for the UE 120, and the scheduling offset associated with the row index is $k_0$, the UE 120 determines that the PDSCH is transmitted by the BS 110 in slot $n+k_0$ and monitors for PDSCH in the slot $n+k_0$. In another example, if the UE 120 receives the PDCCH in slot n indicating a row index and UL grant corresponding to a PUSCH for the UE 120, and the scheduling offset associated with the row index is $k_2$, the UE 120 determines to transmit the PUSCH to the BS 110 in slot $n+k_2$.

The starting symbol index indicates a starting symbol within the slot indicated by the scheduling offset. The UE 120 is configured to utilize the starting symbol to determine a first symbol to use for communicating (e.g., for receiving the PDSCH or transmitting the PUSCH) with the BS 110 in the slot determined based on the scheduling offset. For example, if the starting symbol index associated with the row index from the PDCCH is S, the UE 120 determines that the PDSCH is transmitted by the BS 110 starting at symbol S in slot $n+k_0$ and monitors for PDSCH starting at symbol S in slot $n+k_0$. In another example, if the starting symbol index associated with the row index from the PDCCH is S, the UE 120 determines to transmit the PUSCH starting at symbol S in slot $n+k_2$.

The number of symbols indicates a number of symbols from the symbol indicated by the starting symbol index. The UE 120 is configured to utilize the number of symbols to determine the symbols (including number of symbols) to use for communicating (e.g., for receiving the PDSCH or transmitting the PUSCH) with the BS 110 starting at the first symbol determined based on the starting symbol index. For example, if the number of symbols associated with the row index from the PDCCH is L, the UE 120 determines that the PDSCH is transmitted by the BS 110 on symbols S, S+1, . . . S+(L−1) in slot $n+k_0$ and monitors for PDSCH on symbols S, S+1, . . . S+(L−1) in slot $n+k_0$. In another example, if the number of symbols associated with the row index from the PDCCH is L, the UE 120 determines to transmit the PUSCH on symbols S, S+1, . . . S+(L−1) in slot $n+k_2$.

Figure 5A:
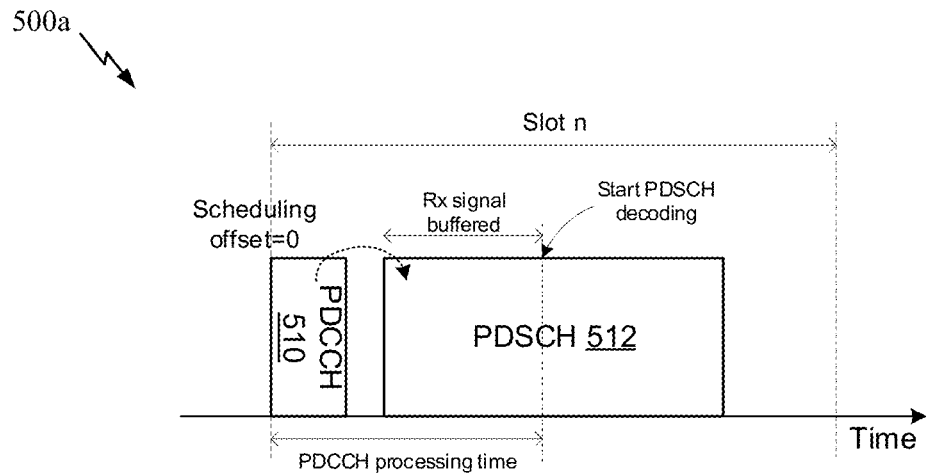
FIG. 5A illustrates wireless communication resources used for communication between at least a BS and a UE, in accordance with certain aspects.
Figure 6:
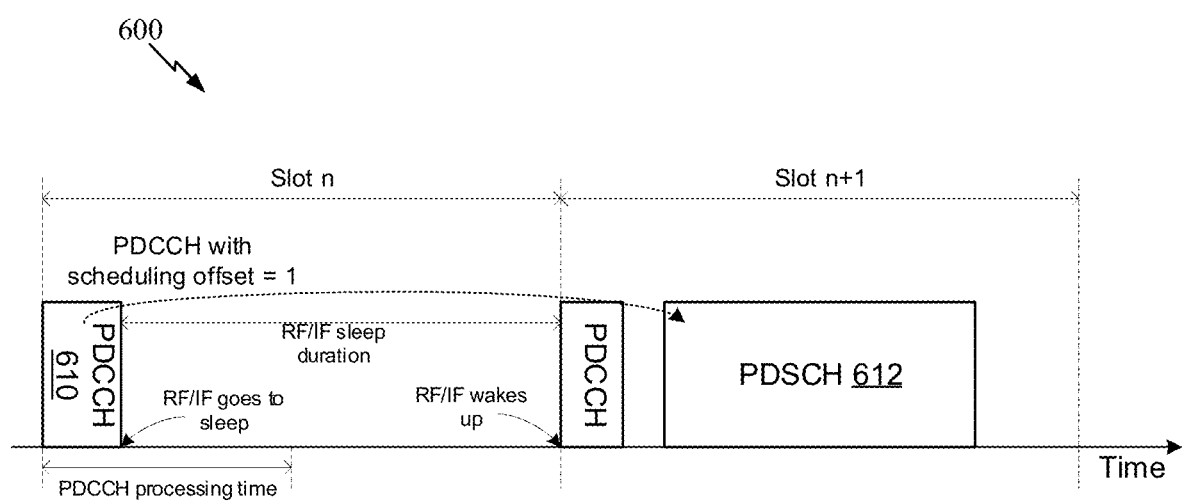
FIG. 6 illustrates wireless communication resources used for communication between at least a BS and a UE, in accordance with certain aspects.

In certain aspects, in same-slot scheduling, the starting symbol index may be limited to symbols of a slot that include or follow symbols used for a control channel (e.g., PDCCH) in that slot. FIG. 5A below illustrates an example of same-slot scheduling. In some examples, in cross-slot scheduling, the starting symbol index may be in any portion of a slot that is subsequent to the slot carrying the PDCCH that indicates the starting symbol index. FIG. 6 below illustrates an example of cross-slot scheduling.

In certain aspects, UE 120 is initially configured (e.g., at manufacture, via an update (e.g., over-the-air (OTA) update), etc.) with one or more default time-domain resource allocation tables. For example, table 400 may correspond to a default time-domain resource allocation table for PDSCH allocation. In certain aspects, the one or more default time-domain resource allocation tables are the same for all UEs 120 in the wireless network 100. Further, in certain aspects, BS 110 configures the UE 120 with one or more UE-specific time-domain resource allocation tables (e.g., overwriting a default time-domain resource allocation table), such as using RRC signaling. In some cases, such RRC signaling can take 20 ms to 30 ms to complete, which causes delays in configuring the UE 120. Further, to configure the UE 120 with one or more UE-specific time-domain resource allocation tables, the BS 110 may send the entirety of the UE-specific time-domain resource allocation tables to the UE 120 using RRC signaling, which utilizes bandwidth and communication resources for sending the entirety of the UE-specific time-domain resource allocation tables to the UE 120.

Though certain aspects are described with respect to UE 120 being configured with time-domain resource allocation tables indicative of different scheduling offsets, it should be noted that UE 120 can be configured in other manners and the various aspects herein can still apply. For example, the UE 120 may have some other type of time-domain resource allocation configuration comprising one or more different configurations each indicative of a scheduling offset.

In certain aspects, the PDSCH is transmitted by the BS 110 in the same slot as the PDCCH scheduling the PDSCH. For example, system information (e.g., remaining minimum system information (RMSI)) may need to be scheduled for transmission on the PDSCH in the same slot as the corresponding PDCCH. In such cases, the PDCCH may indicate a scheduling offset of 0 to the UE 120 to indicate that the PDSCH is scheduled in the same slot as the PDCCH.

In certain aspects, communication (e.g., on the PUSCH or PDSCH) is scheduled across slots. In such cases, the PDCCH may indicate a scheduling offset greater than zero to the UE 120 to indicate that the PDSCH/PUSCH is scheduled in a different slot than the PDCCH.

Since the BS 110 can transmit the PDSCH in the same slot as the PDCCH, the UE 120 needs to be able to support receiving the PDSCH in the same slot as it receives the PDCCH, which can use significant resources of the UE 120. The resources used by the UE 120 to support receiving the PDSCH in the same slot as it receives the PDCCH are discussed in relation to the description of FIGS. 5A and 5B.

FIG. 5A illustrates same-slot scheduling of wireless communication resources 500a used for communication between at least a BS (e.g., BS 110 of FIG. 1) and a UE (e.g., UE 120 of FIG. 1), in accordance with certain aspects. For example, wireless communication resources 500a include time along a horizontal axis (e.g. X-axis) and frequency along a vertical axis (e.g., Y-axis). In certain aspects, the wireless communication resources 500a shown correspond to a single slot n, as shown.

As shown, the BS 110 transmits a PDCCH 510 at a first time in the slot n prior to transmitting the PDSCH 512 at a second time in the slot n that is later than the first time. The UE 120, in certain aspects, performs blind detection on the PDCCH 510 for control information, including scheduling information as discussed. In the example shown in FIG. 5A, the PDCCH 510 includes a DL allocation and a row index value that maps to a scheduling offset of 0, meaning the PDSCH 512 is in the same slot n as the PDCCH 510. It takes the UE 120 a period of time to process the PDCCH 510 to decode and process control information.

As shown in FIG. 5A, the PDCCH processing time extends beyond the beginning of the PDSCH 512 in slot n. In certain aspects, the UE 120 can only begin decoding and processing the PDSCH 512 after it has processed the PDCCH 510. In particular, without processing the PDCCH 510, the UE 120 does not know when the PDSCH 512 is scheduled (e.g., time-domain resources used for the PDSCH 512) or the frequency domain resources used for the PDSCH 512 that are for the specific UE 120. Since the UE 120 does not have information about the resources on which the PDSCH 512 is scheduled prior to processing the PDCCH 510, but the PDSCH 512 could be scheduled prior to processing the PDCCH 510, the UE 120 needs to store (e.g., buffer) all received signals on the downlink that could correspond to the PDSCH 512 from the time after the PDCCH 510 ends (or after a gap period after the PDCCH 510 ends) to the time the PDCCH 510 is fully processed. In particular, the UE 120 needs to buffer such received signals as only after the PDCCH 510 is full processed can the UE 120 determine if the received signals include PDSCH 512 for the UE 120 and process the portion of the received signals including PDSCH 512 for the UE 120. Large memory resources are used to store the entire received signals since resources specific to the UE are unknown until the UE decodes PDCCH 510. This additional use of processing power and storage reduce the capabilities of the UE.

Figure 5B:
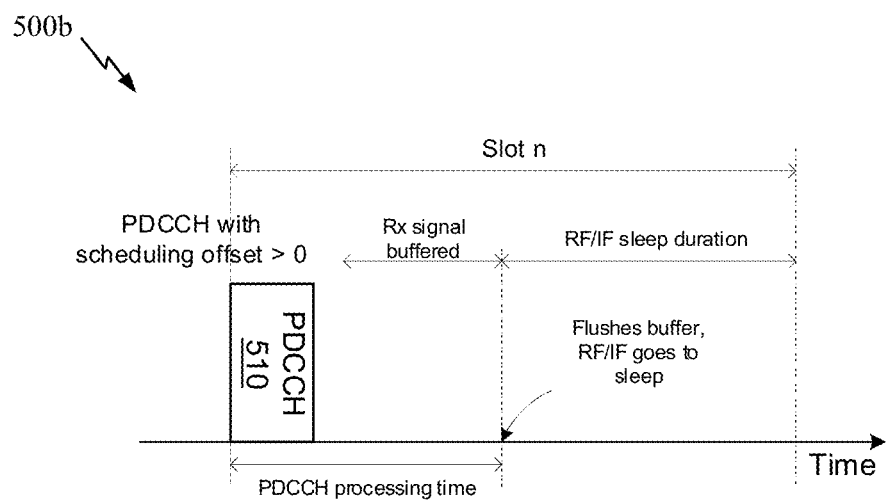
FIG. 5B illustrates wireless communication resources used for communication between at least a BS and a UE, in accordance with certain aspects.

FIG. 5B illustrates wireless communication resources 500b used for communication between at least a BS (e.g., BS 110 of FIG. 1) and a UE (e.g., UE 120 of FIG. 1), in accordance with certain aspects. Wireless communication resources 500b are similar to 500a, except that a PDSCH is not transmitted in the same slot n as the PDCCH 510. In the example shown in FIG. 5B, the PDCCH 510 includes a DCI and a row index value that maps to a scheduling offset greater than 0, meaning the PDSCH is in a different slot than the PDCCH 510.

The UE 120 does not have information about the resources on which the PDSCH is scheduled prior to processing the PDCCH 510, and still has to assume the PDSCH could be scheduled prior to processing the PDCCH 510, so the UE 120 still needs to store (e.g., buffer) all received signals on the downlink that could correspond to the PDSCH from the time after the PDCCH 510 ends (or after a gap period after the PDCCH 510 ends) to the time the PDCCH 510 is fully processed. Only after the PDCCH 510 is fully processed does the UE 120 determine the PDSCH is not in slot n and then it can discard the buffer. Large memory resources are therefore used to buffer the entire received signals that are not actually used. Further, receiver components (e.g., radio frequency/intermediate frequency components, such as transceivers 254) of UE 120 are powered and in an active mode to actually receive the signals on the downlink from the time after the PDCCH 510 ends (or after a gap period after the PDCCH 510 ends) to the time the PDCCH 510 is fully processed, and can only be powered down (e.g., put in sleep mode) after the PDCCH 510 is fully processed and the UE 120 determines it does not have to receive further signals in the slot n. This can cause extra power consumption and use of resources of the receiving components.

Accordingly, certain aspects herein provide techniques for adjusting scheduling offset for wireless communications. In particular, certain aspects provide for dynamically managing scheduling offsets used by a UE 120 to prevent the use of any scheduling offsets with one or more particular values. For example, in certain aspects, the techniques provide for dynamically managing scheduling offsets used by a UE 120 to prevent the use of any scheduling offsets with the value of zero.

FIG. 6 illustrates cross-slot scheduling of wireless communication resources 600 used for communication between at least a BS (e.g., BS 110 of FIG. 1) and a UE (e.g., UE 120 of FIG. 1), in accordance with certain aspects. For example, wireless communication resources 600 include time along a horizontal axis (e.g. X-axis) and frequency along a vertical axis (e.g., Y-axis). In certain aspects, the wireless communication resources 600 shown correspond to a slot n and a slot n+1, as shown.

As shown, the BS 110 transmits a PDCCH 610 at a first time in the slot n prior to transmitting the corresponding PDSCH 612 at a second time in the slot n+1. In the example shown in FIG. 6, the PDCCH 610 includes a DCI and a row index value that maps to a scheduling offset of 1, meaning the PDSCH 612 is 1 slot later than the slot including the PDCCH 610.

In certain aspects, the BS 110 configures the UE 120 to prevent the use of any scheduling offsets with the value of zero. Accordingly, the UE 120 knows that the PDSCH 612 cannot be in the same slot as the PDCCH 610. Therefore, the UE 120 does not need to store any received signals that could correspond to the PDSCH from the time after the PDCCH 610 ends (or after a gap period after the PDCCH 610 ends) to the time the PDCCH 610 is fully processed as there is no possibility of there being a PDSCH during that time. Accordingly, advantageously, memory resources are not used to buffer the entire received signals thereby saving on storage efficiency. Further, in certain aspects, the UE 120 can power down receiving components after the PDCCH 610 ends for the remainder of the slot n, even before the PDCCH 610 is fully processed, as no PDSCH 612 will need to be received in slot n. This advantageously reduces power consumption at the UE 120.

In certain aspects, BS 110 transmits an indication to UE 120 to dynamically change scheduling offset values configured at the UE 120, such as in a time-domain resource allocation table, to prevent the use of any scheduling offsets with one or more particular values (e.g., zero). In certain aspects, the indication is transmitted by the BS 110 to the UE 120 via L1 and/or L2 signaling (e.g., in a DCI or media access control—control element (MAC-CE)). Such signaling may have reduced latency as compared to other signaling such as RRC signaling.

The UE 120 receives the indication and modifies its time-domain resource allocation configuration (e.g., time-domain resource allocation table) to prevent any configurations (e.g., entries) being used to indicate a scheduling offset of at least a first value, such as less than the first value, or of multiple values. In certain aspects, the time-domain resource allocation configuration (e.g., time-domain resource allocation table) is modified so that no configurations (e.g., entries) include a scheduling offset of the at least a first value. In another aspect, the UE 120 determines based on the indication that any configurations with a scheduling offset of the at least a first value are not used for scheduling by the BS 110.

In certain aspects, the indication comprises an offset value greater than zero (e.g., corresponding to the greatest of the at least the first value). The UE 120 then adds the offset value to each scheduling offset of each configuration of the time-domain resource allocation configuration. For example, where the offset value is x, the UE 120 would add x to each scheduling offset of each row of table 400 of FIG. 4.

Figure 7:
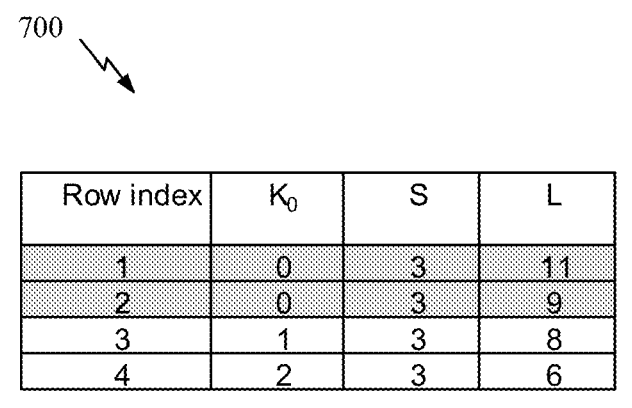

In certain aspects, the indication comprises the at least the first value. The UE 120 then determines that any configurations with a scheduling offset of the at least a first value are not used for scheduling by the BS 110. For example, where the at least the first value is 0, rows 1 and 2 of table 700 of FIG. 7 (similar to table 400 of FIG. 4) would not be used for scheduling.

In certain aspects, the use of an indication such as an offset value or the at least the first value saves on communication resources as little data is transferred from the BS 110 to the UE 120 as compared to transmitting an entire new time-domain resource allocation configuration.

In certain aspects, the indication to dynamically change scheduling offset values transmitted by the BS 110 causes the UE 120 to modify its time-domain resource allocation configuration for only a period of time. Accordingly, after the period of time, the UE 120 reverts to using the unmodified time-domain resource allocation configuration (e.g., the time-domain resource allocation table without the addition of the offset value, use of all configurations, etc.). In certain aspects, the duration of the time period is pre-configured at the UE 120, such as during manufacture, OTA update, etc. In certain aspects, the duration of the time period is configured at the UE 120, such as using RRC signaling. In certain aspects, an indication of the duration of the time period is included in the indication to dynamically change scheduling offset values transmitted by the BS 110. In certain aspects, the duration of the time period is until the BS 110 transmits to the UE 120 another indication that ends the dynamic change.

Example Carrier-Group Based Cross-Slot Scheduling Adaptation

In examples of wireless communication that involve carrier aggregation (CA), a UE (e.g., UE 120a of FIG. 1) may be required to monitor PDCCH on more than one component carrier (CC) simultaneously. In some cases, the wireless communication may be characterized by intra-band CA, where the UE 120a may utilize the same transceiver hardware components for wireless communication across multiple CCs. However, if cross-slot scheduling is used by a UE 120a that utilizes CA, and if at least one CC does not provide an indication of a scheduling offset (e.g., $k_0$) greater than 0, then the transceiver hardware components of the UE 120a must remain in an active power state due to monitoring the at least one CC. Thus, in order to save power, it would be beneficial if the UE 120a's monitoring periodicity and occasion was aligned across the multiple CCs. In this way, monitoring period of the multiple CCs are known, and the UE 120a can reduce the power of the transceiver hardware components during times when the UE 120a does not need to monitor the multiple CCs.

In certain aspects, the UE 120a is configured to receive a time-domain configuration (e.g., the time-domain resource allocation table 400 of FIG. 4) comprising one or more offset values of time-domain resources relative to a reception of a physical downlink control channel PDCCH. For example, in the case of cross-slot scheduling, a PDCCH may include a downlink scheduling assignment that provides a one or more bit value that corresponds to an offset value (e.g., $k_0$ for PDSCH or $k_2$ for PUSCH) in the time-domain configuration. Accordingly, each of the one or more offset values indicate a scheduling offset indicative of a number of slots offset from the reception of the PDCCH that includes the downlink scheduling assignment.

In certain aspects, the UE may be pre-configured with a scheduling adaptation configuration. In some examples, the scheduling adaptation configuration may include one or more minimum offset values relative to reception of the PDCCH, where each of the one or more minimum offset values correspond to one or more CCs of a group of CCs, and indicate a minimum scheduling offset indicative of a minimum number of slots offset from the reception of PDCCH.

In some examples, the UE 120a may receive the scheduling adaptation configuration from BS 110. In some examples, the UE 120a may receive the scheduling adaptation configuration and the time-domain configuration separately. In one example, the BS 110 may determine the group of CCs based on which frequency bands each CC belongs to. That is, the UE 120a may receive information indicative of carriers that form the group of carriers from a BS 110. For example, the BS 110 may group a plurality of CCs, where the plurality of CCs all share the same numerology, are in the same band (e.g., intra-band CA), and/or share the same transceiver component (e.g., transceivers 254*a* through 254*r*, antennas 252*a* through 252*r* of FIG. 4) of the UE during wireless communication.

Alternatively, the UE 120*a* may generate and transmit a report to the BS 110, wherein the report indicates a preferred CC grouping. That is, the UE 120*a* may transmit information indicative of carriers that form the group of carriers to the BS 110. Thus, in some examples, the BS 110 may provide the UE 120*a* with a scheduling adaptation configuration based on the UE 120*a*'s preferred CC grouping. It should be noted that in some examples, the UE 120*a* may be configured with a plurality of groups of carriers, and thus, may communicate over more than one CC group. In some cases, the more than one CC group may include overlapping CCs in two or more of the groups. For example, at least one carrier may be included in at least two of the plurality of groups of carriers.

In certain aspects, the UE 120*a* may receive the time-domain configuration from the BS 110 via Layer 3 signaling (e.g., radio resource control (RRC) signaling), while in some examples, the UE 120*a* may receive the scheduling adaptation configuration from the BS 110 via Layer 1 or Layer 2 signaling (e.g., in downlink control information (DCI) or a medium access control (MAC) control element (CE)). In some examples, the scheduling adaptation configuration may be delivered and received by the UE 120*a* via any of the CCs in the group of CCs.

In some examples, the UE 120*a* may monitor for control signaling on an anchor CC (or "anchor carrier"), and/or transmit and receive control information and data on the anchor CC. In one example, the UE 120*a* transmits and receives control information related to the anchor CC as well as other CCs in the group via the anchor CC. The anchor CC may be selected based on CC quality or through network selection. In some examples, communications over the anchor CC have priority over the other CCs in the group. For example, the UE 120*a* may prevent CCs other than the anchor CC from transmitting or receiving when the anchor CC is receiving or transmitting respectively in a particular time period. That is, the UE 120*a* may prevent other CCs from transmitting when the anchor CC is receiving, or prevent the other CCs from receiving when the anchor CC is transmitting. Accordingly, in certain aspects, the scheduling adaptation configuration may be received by the UE 120*a* via an anchor CC in the group of CCs. In some examples, an anchor CC may be configured for each group of CCs if there are multiple groups. Alternatively, there may be only one anchor CC (e.g., PCell or PSCell), in which case the anchor CC may be identified by the UE 120*a* via the scheduling adaptation configuration from the BS 110.

FIG. 8 illustrates an example scheduling adaptation configuration table 800 for use for a PDSCH. It should be noted that UE 120*a* may be configured with a similar scheduling adaptation configuration table for use for a PUSCH, or may be configured with a single scheduling adaptation configuration table for use for both the PDSCH and PUSCH, etc.

As shown, the scheduling adaptation configuration table 800 includes columns corresponding to CCs in a particular group (e.g., in some examples the scheduling adaptation configuration table 800 corresponds to a single group of CCs), a Set 0 corresponding to a set of minimum offset values for same-slot scheduling, and a Set 1 corresponding to a set of minimum offset values for cross-slot scheduling. Each row corresponds to a CC in the group of CCs. In this example, there are four rows corresponding to four different component carriers (e.g., CC1, CC2, CC3, CC4) in the group of CCs. In certain aspects, table 800 includes additional sets (e.g., Set 2, Set 3, etc.), and more or less CCs.

In the example table, the minimum offset values (e.g., minimum $k_0$ values) for same-slot scheduling for each of the CCs is equal to 0, while the minimum offset values for cross-slot scheduling for each of the CCs is greater than 0. Accordingly, each CC in the group of CCs has a minimum scheduling offset associated with it, in terms of slot offset for each of same-slot scheduling and cross-slot scheduling.

In some example, a UE 120*a* may receive a PDCCH that includes one or more bits configured to indicate which set (e.g., Set 0 or Set 1) to use for monitoring for a corresponding PDSCH. In the example illustrated in FIG. 8, there are only two sets, so the indication may be communicated over a single bit. In some examples, the one or more bits may be included in a DCI communicated by the BS 110 and received by the UE 120*a*.

In one example, if the bit is set to 0, then there is no cross-slot scheduling adaptation. Thus, any entries in the time-domain configuration can be used for scheduling a corresponding PDSCH or PUSCH. If the bit is set to 1, then cross-slot scheduling can be used for all CC in the group of CCs. Thus, the minimum offset value of the corresponding carrier is determined based on the set indicated to the UE 120*a* by the BS 110. For example, referring to the time-domain configuration table of FIG. 4 and the scheduling adaptation configuration table 800 of FIG. 8, the UE 120*a* may determine to monitor according to the row indices 3 and 4 of the time-domain configuration table 400. This is because the minimum offset values (e.g., minimum $k_0$ values) of CC1 and CC2 are equal to "1" which means that row indices 1 and 2 of the time domain configuration table 400 cannot be used (the $k_0$ values of row indices 1 and 2 are both equal to "0"). However, row indices 3 and 4 of the time domain configuration table 400 are "1" and "2," respectively. Hence, CC1 and CC2 can utilize the scheduling of both indices 3 and 4, and CC3 and CC4 can utilize only index 4.

Thus, in certain aspects, the UE 120*a* may determine, for each CC of the group of CCs, which at least one offset value of the one or more offset values are greater than or equal to a minimum offset value of the corresponding carrier. In one example, the offset value of row index 3 of the time-domain configuration table 400 is equal to "1." Here, because the minimum offset value of both CC1 and CC2 is equal to 1, the UE 120*a* may determine that the offset value or row index 3 is greater than or equal to the minimum offset value of both CC1 and CC2. Accordingly, monitoring PDSCH on CC1 and CC2 can occur at least one slot offset ($k_0$) from a PDCCH that schedules a downlink communication. Similarly, monitoring PDSCH on CC3 and CC4 can occur at least two slot offset from a PDCCH that schedules a downlink communication. That is, for each carrier of the group of carriers, the UE 120*a* can monitor a PDSCH at time-domain resources corresponding to at least one offset value of the one or more offset values that are greater than or equal to the minimum offset value of the corresponding carrier.

In certain aspects, the UE 120*a* may determine to monitor the PDCCH of each CC of the group of CCs based on scheduled PDCCH monitoring periods of a first CC of the group of CCs having a lowest periodicity of scheduled PDCCH monitoring periods among the group of CCs. For example, the UE 120*a* may determine a periodicity of each CC in the group of CCs, then determine which CC of the group of CCs has the lowest (or most frequent) monitoring periodicity, and monitor for the PDCCH of each CC in the group of CCs according to the lowest monitoring periodicity.

Figure 9A:
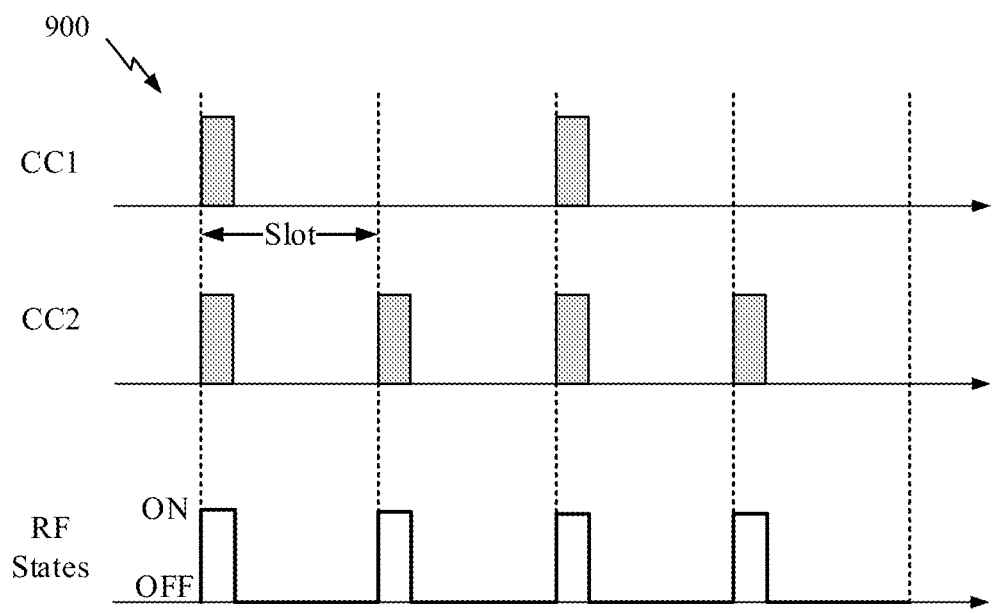
FIG. 9A illustrates monitoring periods of wireless communication resources used for communication between at least a BS and a UE, in accordance with certain aspects.

For example, FIG. 9A illustrates monitoring periods of wireless communication resources 900 used for communication between at least a BS (e.g., BS 110 of FIG. 1) and a UE (e.g., UE 120 of FIG. 1), in accordance with certain aspects. For example, wireless communication resources 900 include time along a horizontal axis (e.g. X-axis) and frequency along a vertical axis (e.g., Y-axis). In certain aspects, the wireless communication resources 900 shown correspond to multiple contiguous slots, as shown.

In the example of FIG. 9A, a group of CCs may include CC1 and CC2. CC1 has a PDCCH monitoring periodicity of two slots. For example, the UE 120*a* monitors CC1 for PDCCH every two slots. Conversely, CC2 has a PDCCH monitoring periodicity of one slot. For example, the UE 120*a* monitors CC2 for PDCCH every slot. Thus, in this example, the UE 120*a* may determine to monitor both CC1 and CC2 for PDCCH according to the lowest monitoring periodicity, which is one slot.

In some examples, when the UE 120*a* is not monitoring the PDCCH, the UE 120*a* powers down a transceiver component of the UE 120*a*. For example, FIG. 9A illustrates an "RF states" row showing times and durations of transceiver power states. In this example, the UE 120*a* powers on the transceiver components during the lowest periodicity to monitor for the PDCCH for each CC of the group of CCs (e.g., CC1 and CC2). In some examples, if CC1 and CC2 are part of a carrier aggregated (CA) communication, the amount of power used by the UE 120*a* will be reduced by cycling power to the transceiver components.

In some examples, the UE 120*a* may determine to monitor the PDCCH of each CC of the group of CC based on a largest configured subcarrier spacing (SCS) for monitoring PDCCH among the group of CCs. For example, the UE 120*a* may determine an SCS of each CC in the group of CCs, then determine which CC of the group of CCs has the largest SCS, and monitor for the PDCCH of each CC in the group of CCs according to the largest SCS.

Figure 9B:
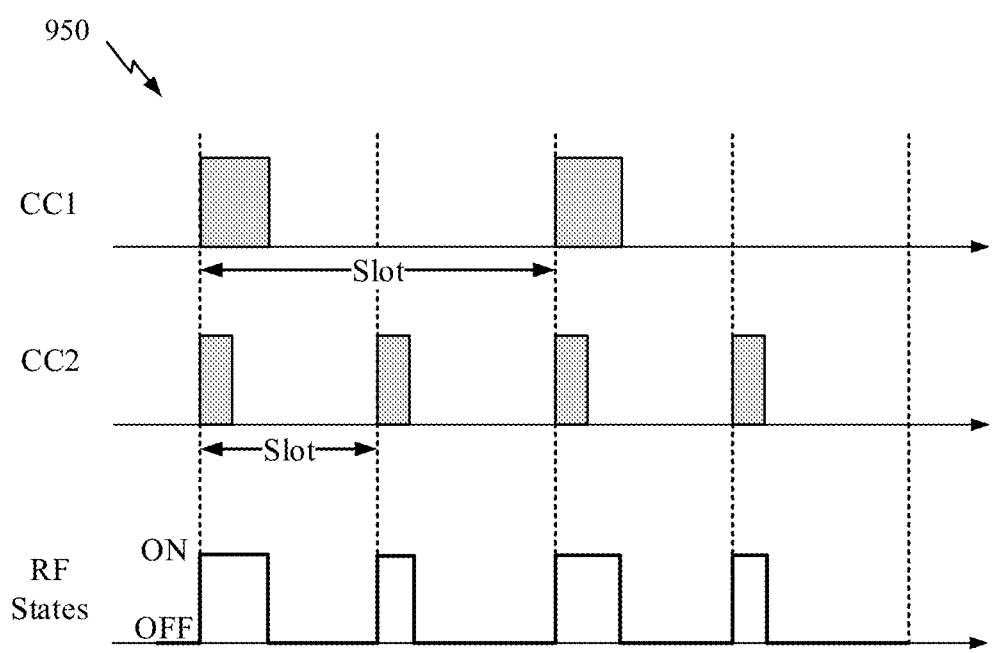
FIG. 9B illustrates monitoring periods of wireless communication resources used for communication between at least a BS and a UE, in accordance with certain aspects.

For example, FIG. 9B illustrates monitoring periods of wireless communication resources 950 used for communication between at least a BS (e.g., BS 110 of FIG. 1) and a UE (e.g., UE 120 of FIG. 1), in accordance with certain aspects. For example, wireless communication resources 950 include time along a horizontal axis (e.g. X-axis) and frequency along a vertical axis (e.g., Y-axis). In certain aspects, the wireless communication resources 950 shown correspond to multiple contiguous slots, as shown.

In the example of FIG. 9B, a group of CCs may include CC1 and CC2. CC2 has a larger SCS spacing than CC1 by two times (e.g., the slot duration of CC2 is half of the slot duration of CC1). Thus, the UE 120*a* may monitor the each of the overlapping CC1 and CC2 slots using the larger subcarrier spacing of CC2.

Similar to FIG. 9A, when the UE 120*a* is not monitoring the PDCCH, the UE 120*a* may power down transceiver components of the UE 120*a*. For example, FIG. 9B illustrates an "RF states" row showing times and durations of transceiver power states. In this example, the UE 120*a* powers on the transceiver components during the lowest periodicity to monitor for the PDCCH for each CC of the group of CCs (e.g., CC1 and CC2), and during the largest subcarrier spacing.

In some examples, the UE 120*a* may determine to monitor a PDCCH of each of the CCs in the group of CCs based on both of the CC having the lowest periodicity, and the CC having the largest SCS.

In certain aspects, the UE 120*a* may determine to monitor the PDCCH of each CC of the group of CCs based on whether one CC of the group of CCs is an anchor CC. For example, the UE 120*a* may determine to monitor a PDCCH of each CC of the group of CCs based on scheduled PDCCH monitoring periods of the anchor CC. In such an example, the UE 120*a* may refrain from monitoring the PDCCH on any scheduled PDCCH monitoring periods of any CC of the group of CCs that do not overlap with the scheduled PDCCH monitoring periods of the anchor CC. In some examples, when the UE 120*a* refrains from monitoring the PDCCH, the UE 120*a* powers down a transceiver component of the UE 120*a*.

In certain aspects, the UE 120*a* may monitor the PDCCH on any scheduled PDCCH monitoring periods of any CC of the group of CCs that do not overlap with the scheduled PDCCH monitoring periods of the first carrier and do overlap with a period for monitoring the PDSCH on any other CCs in the group. In some examples, the UE 120*a* may determine to monitor the PDCCH on each carrier of the group of carriers at the scheduled PDCCH monitoring periods of the first carrier.

Figure 10A:
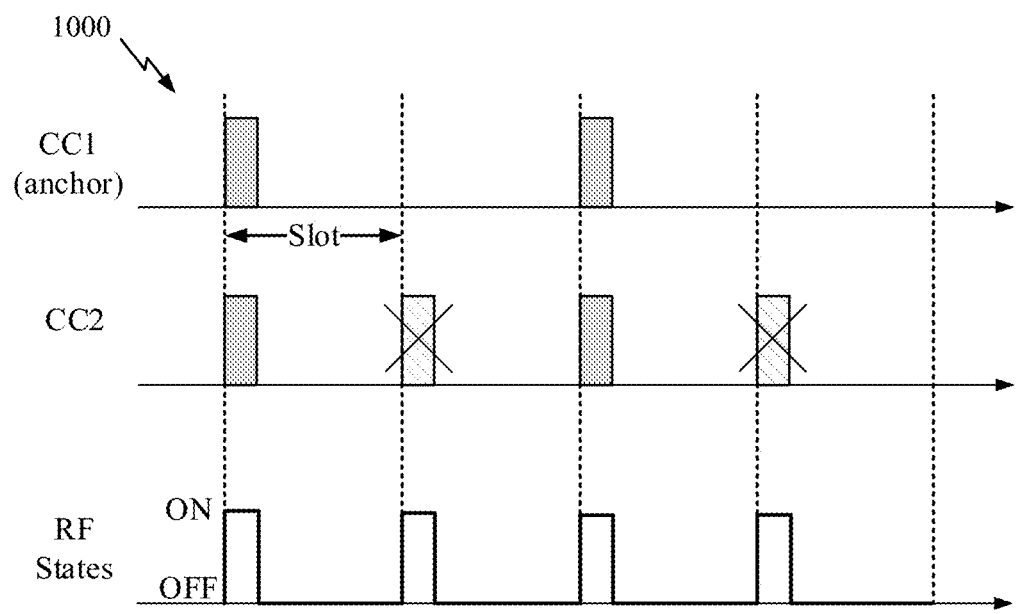
FIG. 10A illustrates monitoring periods of wireless communication resources used for communication between at least a BS and a UE, in accordance with certain aspects.

For example, FIG. 10A illustrates monitoring periods of wireless communication resources 1000 used for communication between at least a BS (e.g., BS 110 of FIG. 1) and a UE (e.g., UE 120 of FIG. 1), in accordance with certain aspects. For example, wireless communication resources 1000 include time along a horizontal axis (e.g. X-axis) and frequency along a vertical axis (e.g., Y-axis). In certain aspects, the wireless communication resources 1000 shown correspond to multiple contiguous slots, as shown.

In this example, CC1 is an anchor CC having a monitoring periodicity of two slots, and CC2 is a non-anchor CC having a monitoring periodicity of one slot. In this example, although CC2 has the lowest monitoring periodicity, the UE 120*a* may adopt the periodicity of the anchor slot (e.g., CC1) and ignore certain PDCCH instances of CC2 (shown as PDCCH instances that are crossed out). It should be noted that the transceiver components may be powered on and off according to the anchor CC monitoring periodicity.

Figure 10B:
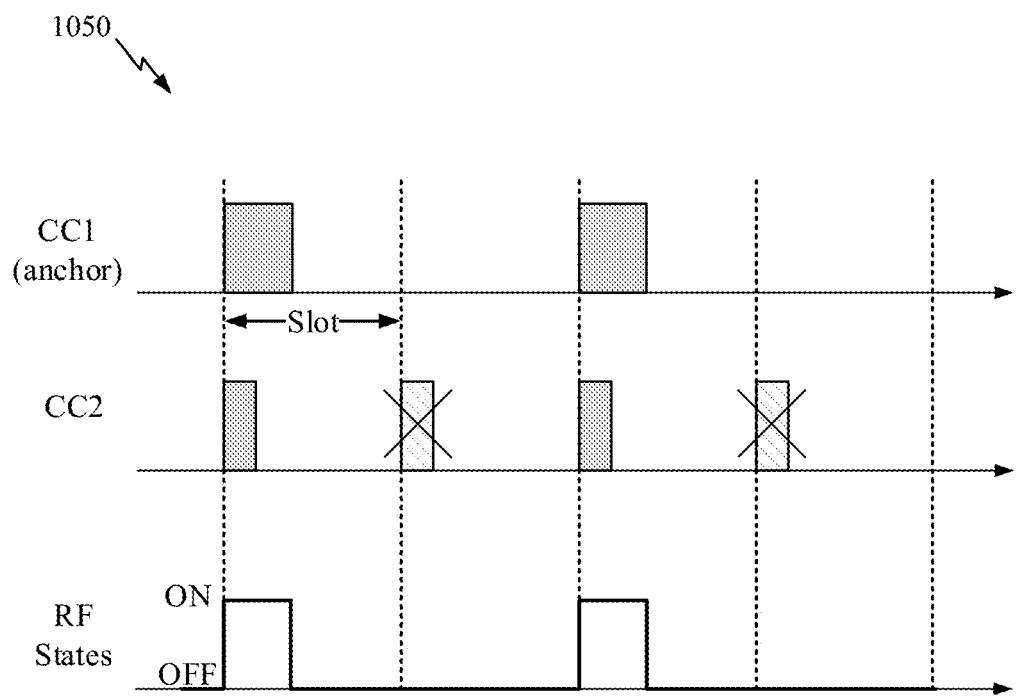
FIG. 10B illustrates monitoring periods of wireless communication resources used for communication between at least a BS and a UE, in accordance with certain aspects.

In another example, FIG. 10B illustrates monitoring periods of wireless communication resources 1050 used for communication between at least a BS (e.g., BS 110 of FIG. 1) and a UE (e.g., UE 120 of FIG. 1), in accordance with certain aspects. For example, wireless communication resources 1050 include time along a horizontal axis (e.g. X-axis) and frequency along a vertical axis (e.g., Y-axis). In certain aspects, the wireless communication resources 1050 shown correspond to multiple contiguous slots, as shown.

In this example, CC1 is an anchor CC having a monitoring periodicity of one slot and a smaller SCS relative to CC2, whereas CC2 is a non-anchor CC also having a monitoring periodicity of one slot. In this example, the UE 120*a* may adopt the periodicity of the anchor slot (e.g., CC1) and ignore certain PDCCH instances of CC2 (shown as PDCCH instances that are crossed out). It should be noted that the transceiver components may be powered on and off according to the anchor CC monitoring periodicity.

Figure 11:
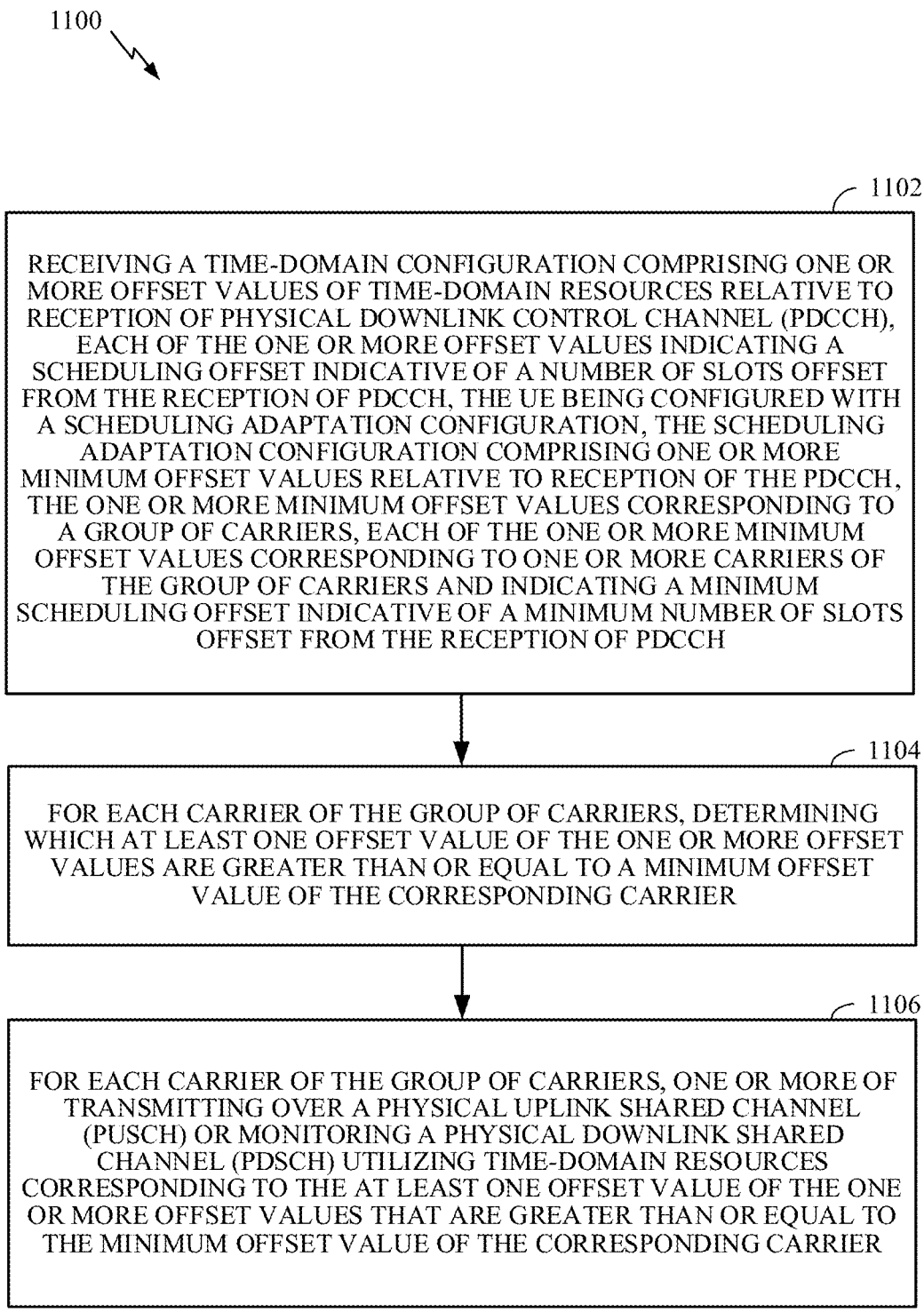
FIG. 11 shows operations of a method of wireless communication performed at a UE in accordance with certain aspects of the disclosure.

FIG. 11 shows operations 1100 of a method of wireless communication performed at a UE in accordance with certain aspects of the disclosure. Operations 1100 begin at block 1102 by a UE receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

Continuing at block 1104, the UE, for each carrier of the group of carriers, determining which at least one offset value of the one or more offset values are greater than or equal to a minimum offset value of the corresponding carrier.

Continuing to block 1106, the UE, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

In certain aspects, the operations 1100 include receiving information indicative of carriers that form the group of carriers from a base station (BS).

In certain aspects, the group of carriers comprise one or more of: carriers that share the same numerology or carriers that are in the same frequency band, or carriers that share the same transceiver component of the UE during wireless communication.

In certain aspects, the operations 1100 include transmitting information indicative of carriers that form the group of carriers to a base station (BS).

In certain aspects, the UE is configured with a plurality of groups of carriers.

In certain aspects, at least one carrier is in at least two of the plurality of groups of carriers.

In certain aspects, one or more of the time-domain configuration and the scheduling adaptation configuration is received in a radio resource control (RRC) message using Layer 3 signaling, or a downlink control information (DCI) or a media access control (MAC) control element (CE) and using Layer 1 or Layer 2 signaling.

In certain aspects, the operations 1100 include receiving the scheduling adaptation configuration on a carrier of the group of carriers.

In certain aspects, the carrier is an anchor carrier of the group of carriers.

In certain aspects, the operations 1100 include receiving the scheduling adaptation configuration, wherein the scheduling adaptation configuration and the time-domain configuration are received separately.

In certain aspects, the scheduling adaptation configuration comprises a plurality of sets of one or more minimum offset values, and further comprising receiving signaling comprising one or more bits indicative of a first set of the plurality of sets, wherein, for each carrier of the group of carriers, the minimum offset value of the corresponding carrier is determined from the first set.

In certain aspects, the one or more bits are received via a downlink control information (DCI).

In certain aspects, a first carrier of the group of carriers is an anchor carrier, and the operations 1100 include determining to monitor a PDCCH of each carrier of the group of carriers based on scheduled PDCCH monitoring periods of the first carrier.

In certain aspects, determining to monitor the PDCCH of each carrier of the group of carriers based on scheduled PDCCH monitoring periods of the first carrier comprises refraining from monitoring the PDCCH on any scheduled PDCCH monitoring periods of any carrier of the group carriers that do not overlap with the scheduled PDCCH monitoring periods of the first carrier.

In certain aspects, refraining from monitoring the PDCCH comprises powering down a transceiver component of the UE.

In certain aspects, refraining from monitoring the PDCCH on any scheduled PDCCH monitoring periods of any of carrier of the group of carriers that do not overlap with the scheduled PDCCH monitoring periods of the first carrier comprises monitoring the PDCCH on any scheduled PDCCH monitoring periods of any of carrier of the group of carriers that do not overlap with the scheduled PDCCH monitoring periods of the first carrier and do overlap with a period for monitoring the PDSCH.

In certain aspects, determining to monitor the PDCCH of each carrier of the group of carriers based on scheduled PDCCH monitoring periods of the first carrier comprises monitoring the PDCCH on each carrier of the group of carriers at the scheduled PDCCH monitoring periods of the first carrier.

In certain aspects, the operations 1100 include determining to monitor the PDCCH of each carrier of the group of carriers based on scheduled PDCCH monitoring periods of a first carrier of the group of carriers having a lowest periodicity of scheduled PDCCH monitoring periods among the group of carriers.

In certain aspects, the operations include determining to monitor the PDCCH of each carrier of the group of carriers based on a largest configured subcarrier spacing for monitoring PDCCH among the group of carriers.

Figure 12:
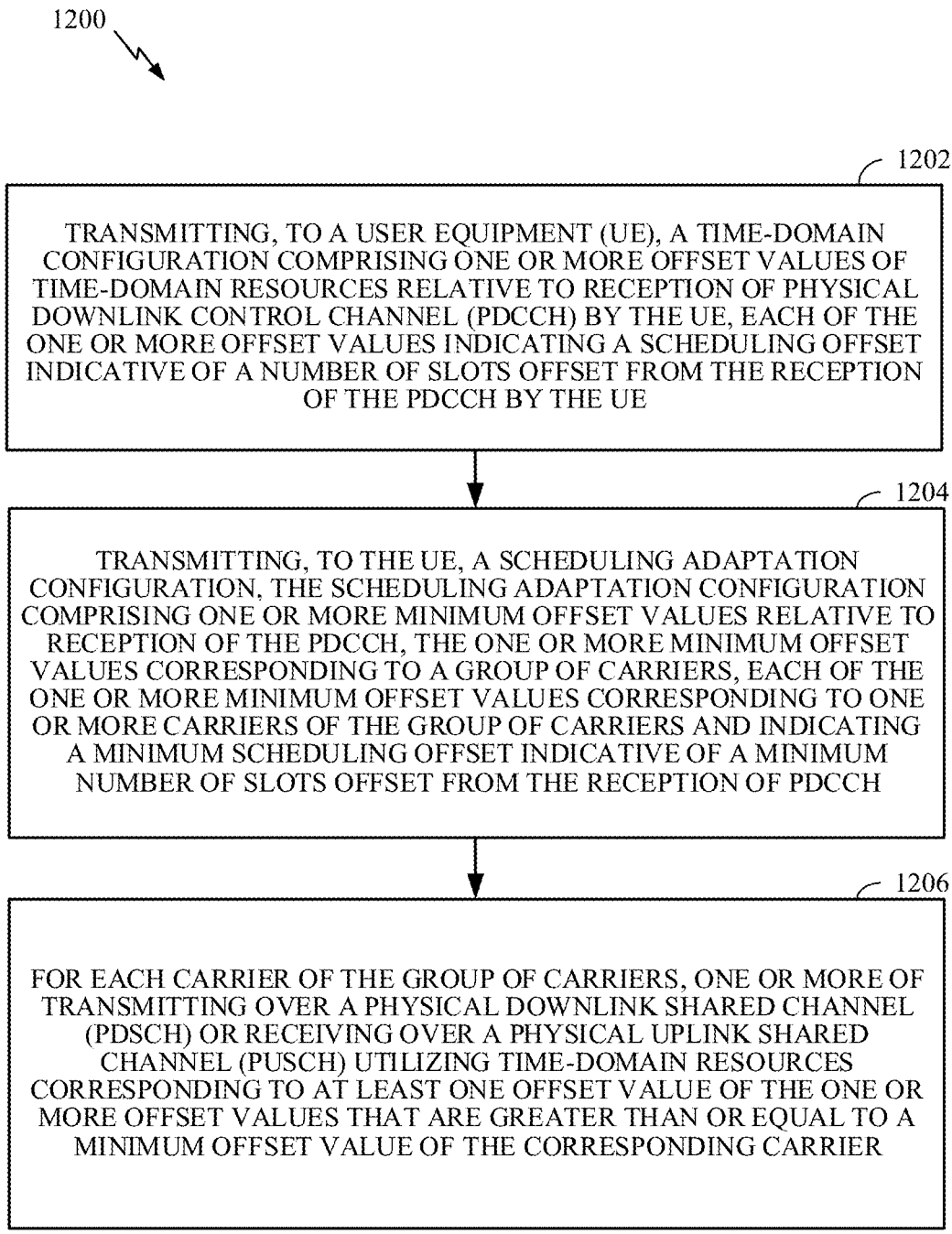
FIG. 12 shows operations of a method of wireless communication performed at a BS in accordance with certain aspects of the disclosure.

FIG. 12 shows operations 1200 of a method of wireless communication performed at a BS in accordance with certain aspects of the disclosure. Operations 1200 begin at block 1202 by a BS transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE.

Continuing at block 1204, the BS transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

Continuing at block 1206, the BS, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

Figure 13:
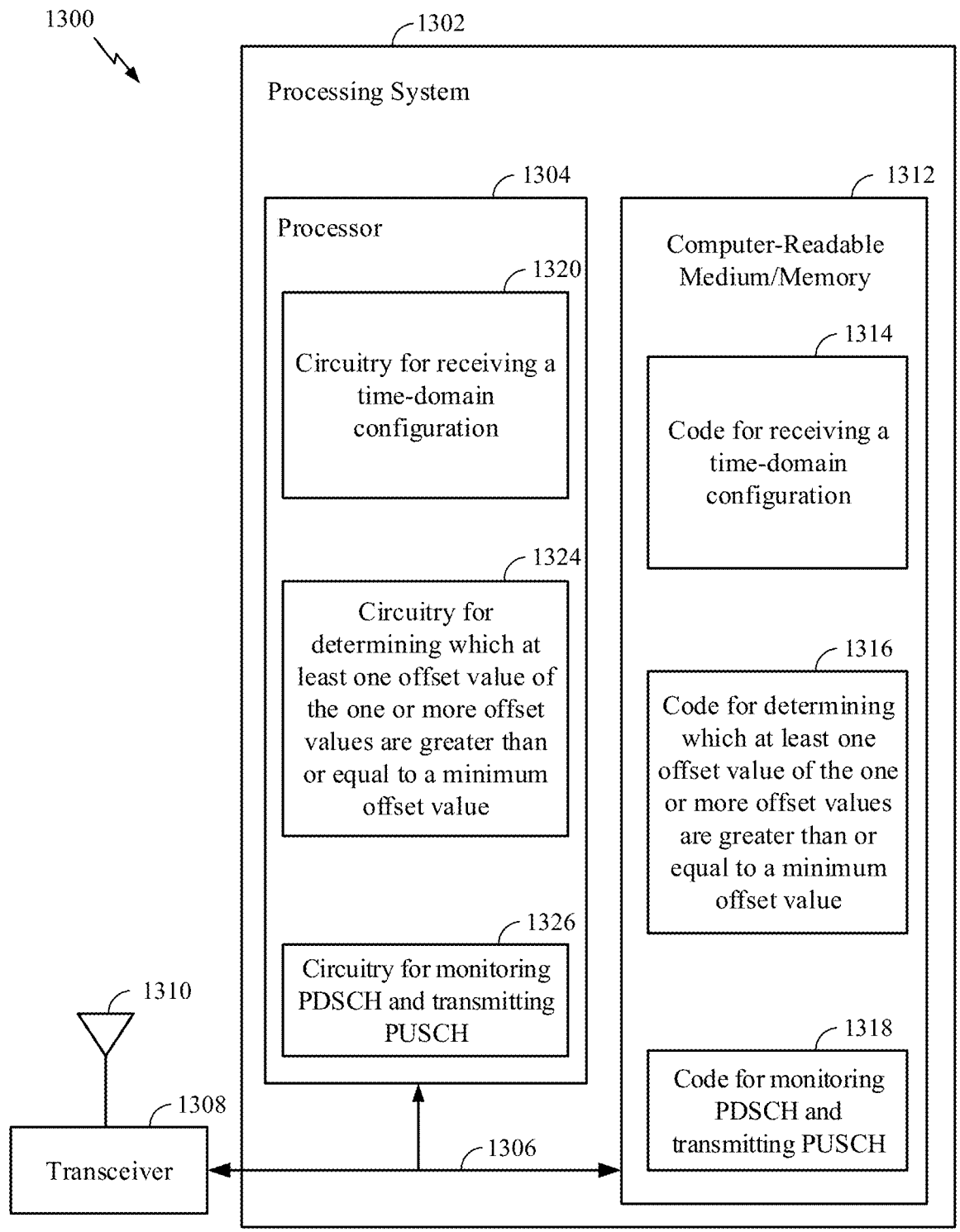
FIG. 13 illustrates a communications device that may include various components configured to perform operations for the techniques disclosed herein, such as the operations illustrated in FIG. 11.

FIG. 13 illustrates a communications device 1300 that may include various components (e.g., corresponding to means-plus-function components) configured to perform operations for the techniques disclosed herein, such as the operations illustrated in FIG. 11. In some examples, the communications device may correspond to the UE 120a of FIG. 1. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for scheduling adaptation of cross slot communications.

In certain aspects, computer-readable medium/memory 1312 stores code 1314 for receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

In certain aspects, computer-readable medium/memory 1312 stores code 1316 for, for each carrier of the group of carriers, determining which at least one offset value of the one or more offset values are greater than or equal to a minimum offset value of the corresponding carrier.

In certain aspects, computer-readable medium/memory 1312 stores code 1318, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

In certain aspects, the processor 1304 has circuitry configured to implement the code stored in the computer-readable medium/memory 1312. The processor 1304 includes circuitry 1320 for receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

The processor 1304 may also include circuitry 1324 for, for each carrier of the group of carriers, determining which at least one offset value of the one or more offset values are greater than or equal to a minimum offset value of the corresponding carrier.

The processor 1304 may also include circuitry 1326 for, for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

Figure 14:
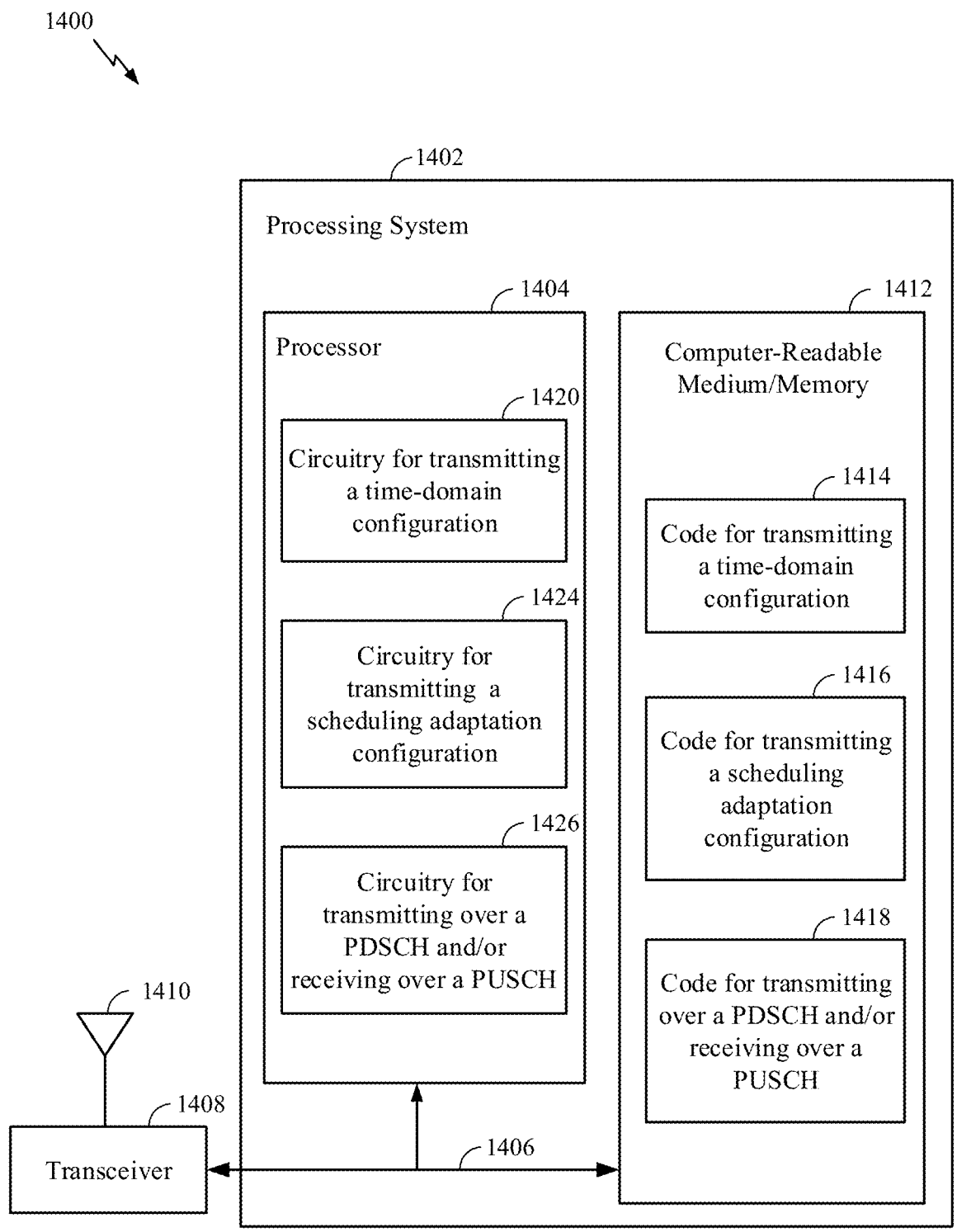
FIG. 14 illustrates a communications device that may include various components configured to perform operations for the techniques disclosed herein, such as the operations illustrated in FIG. 12.

FIG. 14 illustrates a communications device 1400 that may include various components (e.g., corresponding to means-plus-function components) configured to perform operations for the techniques disclosed herein, such as the operations illustrated in FIG. 12. In some examples, the communications device may correspond to the BS 110a of FIG. 1. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 12, or other operations for performing the various techniques discussed herein for scheduling adaptation of cross slot communications.

In certain aspects, computer-readable medium/memory 1412 stores code 1414 for transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE.

In some examples, computer-readable medium/memory 1412 stores code 1416 for transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

In some examples, computer-readable medium/memory 1412 stores code 1418 for, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

In certain aspects, the processor 1404 has circuitry configured to implement the code stored in the computer-readable medium/memory 1412. The processor 1404 includes circuitry 1420 for transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE.

In some examples, the processor 1404 includes circuitry 1424 for transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH.

In some examples, the processor 1404 includes circuitry 1426 for, for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: receiving a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH; for each carrier of the group of carriers, determining which at least one offset value of the one or more offset values are greater than or equal to a minimum offset value of the corresponding carrier; and for each carrier of the group of carriers, one or more of transmitting over a physical uplink shared channel (PUSCH) or monitoring a physical downlink shared channel (PDSCH) utilizing time-domain resources corresponding to the at least one offset value of the one or more offset values that are greater than or equal to the minimum offset value of the corresponding carrier.

Embodiment 2: The method of Embodiment 1, further comprising receiving information indicative of carriers that form the group of carriers from a base station (BS).

Embodiment 3: The method of Embodiments 1 or 2, wherein the group of carriers comprise one or more of: carriers that share the same numerology or carriers that are in the same frequency band, or carriers that share the same transceiver component of the UE during wireless communication.

Embodiment 4: The method of any of Embodiments 1-3, further comprising transmitting information indicative of carriers that form the group of carriers to a base station (BS).

Embodiment 5: The method of Embodiments 1-4, wherein the UE is configured with a plurality of groups of carriers, and wherein at least one carrier is in at least two of the plurality of groups of carriers.

Embodiment 6: The method of any of Embodiments 1-5, wherein one or more of the time-domain configuration and the scheduling adaptation configuration is received in a radio resource control (RRC) message using Layer 3 signaling, or a downlink control information (DCI) or a media access control (MAC) control element (CE) and using Layer 1 or Layer 2 signaling.

Embodiment 7: The method of any of Embodiments 1-6, further comprising receiving the scheduling adaptation configuration on a carrier of the group of carriers.

Embodiment 8: The method of Embodiment 7, wherein the carrier is an anchor carrier of the group of carriers.

Embodiment 9: The method of any of Embodiments 1-8, further comprising receiving the scheduling adaptation configuration, wherein the scheduling adaptation configuration and the time-domain configuration are received separately.

Embodiment 10: The method of any of Embodiments 1-9, wherein the scheduling adaptation configuration comprises a plurality of sets of one or more minimum offset values, and further comprising receiving signaling comprising one or more bits indicative of a first set of the plurality of sets, wherein, for each carrier of the group of carriers, the minimum offset value of the corresponding carrier is determined from the first set.

Embodiment 11: The method of Embodiments 1-10, wherein the one or more bits are received via a downlink control information (DCI).

Embodiment 12: The method of any of Embodiments 1-11, wherein a first carrier of the group of carriers is an anchor carrier, and further comprising determining to monitor a PDCCH of each carrier of the group of carriers based on scheduled PDCCH monitoring periods of the first carrier.

Embodiment 13: The method of Embodiment 1-12, wherein determining to monitor the PDCCH of each carrier of the group of carriers based on scheduled PDCCH monitoring periods of the first carrier comprises refraining from monitoring the PDCCH on any scheduled PDCCH monitoring periods of any carrier of the group of carriers that do not overlap with the scheduled PDCCH monitoring periods of the first carrier.

Embodiment 14: The method of any of Embodiments 1-13 wherein refraining from monitoring the PDCCH comprises powering down a transceiver component of the UE.

Embodiment 15: The method of any of Embodiments 1-14, wherein refraining from monitoring the PDCCH on any scheduled PDCCH monitoring periods of any of carrier of the group of carriers that do not overlap with the scheduled PDCCH monitoring periods of the first carrier comprises monitoring the PDCCH on any scheduled PDCCH monitoring periods of any of carrier of the group of carriers that do not overlap with the scheduled PDCCH monitoring periods of the first carrier and do overlap with a period for monitoring the PDSCH.

Embodiment 16: The method of any of Embodiments 1-15, wherein determining to monitor the PDCCH of each carrier of the group of carriers based on scheduled PDCCH monitoring periods of the first carrier comprises monitoring the PDCCH on each carrier of the group of carriers at the scheduled PDCCH monitoring periods of the first carrier.

Embodiment 17: The method of Embodiment 1-16, further comprising determining to monitor the PDCCH of each carrier of the group of carriers based on scheduled PDCCH monitoring periods of a first carrier of the group of carriers having a lowest periodicity of scheduled PDCCH monitoring periods among the group of carriers.

Embodiment 18: The method of any of Embodiments 1-17, further comprising determining to monitor the PDCCH of each carrier of the group of carriers based on a largest configured subcarrier spacing for monitoring PDCCH among the group of carriers.

Embodiment 19: A user equipment (UE) configured for scheduling wireless communications, the UE comprising: a memory; and a processor communicatively coupled to the memory, the processor and the memory configured to: receive a time-domain configuration comprising one or more offset values of time-domain resources relative to reception of physical downlink control channel (PDCCH), each of the one or more offset values indicating a scheduling offset indicative of a number of slots offset from the reception of PDCCH, the UE being configured with a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH; for each carrier of the group of carriers, determine which at least one offset value of the one or more offset values are greater than or equal to a minimum offset value of the corresponding carrier; and for each carrier of the group of carriers, one or more of transmit over a physical uplink shared channel (PUSCH) or monitor a physical downlink shared channel (PDSCH) utilizing time-domain resources corresponding to the at least one offset value of the one or more offset values that are greater than or equal to the minimum offset value of the corresponding carrier.

Embodiment, 20: The UE of Embodiment 19, wherein the processor and the memory are further configured to receive information indicative of carriers that form the group of carriers from a base station (BS).

Embodiment 21: The UE of any of Embodiment 19 or Embodiment 20, wherein the group of carriers comprise one or more of: carriers that share the same numerology or carriers that are in the same frequency band, or carriers that share the same transceiver component of the UE during wireless communication.

Embodiment 22: The UE of any of Embodiments 19-21, wherein the processor and the memory are further configured to transmit information indicative of carriers that form the group of carriers to a base station (BS).

Embodiment 23: The UE of any of Embodiments 19-22, wherein: the UE is configured with a plurality of groups of carriers, and at least one carrier is in at least two of the plurality of groups of carriers.

Embodiment 24: The UE of any of Embodiments 19-23, wherein one or more of the time-domain configuration and the scheduling adaptation configuration is received in a radio resource control (RRC) message using Layer 3 signaling, or a downlink control information (DCI) or a media access control (MAC) control element (CE) and using Layer 1 or Layer 2 signaling.

Embodiment 25: The UE of any of Embodiments 19-24, wherein the processor and the memory are further configured to receive the scheduling adaptation configuration on a carrier of the group of carriers.

Embodiment 26: The UE of any of Embodiments 19-25, wherein the carrier is an anchor carrier of the group of carriers.

Embodiment 27: The UE of any of Embodiments 19-26, wherein the processor and the memory are further configured to receive the scheduling adaptation configuration, wherein the scheduling adaptation configuration and the time-domain configuration are received separately.

Embodiment 28: The UE of any of Embodiments 19-27, wherein the scheduling adaptation configuration comprises a plurality of sets of one or more minimum offset values, wherein the processor and the memory are further configured to receive signaling comprising one or more bits indicative of a first set of the plurality of sets, wherein, for each carrier of the group of carriers, the minimum offset value of the corresponding carrier is determined from the first set.

Embodiment 29: A method for scheduling wireless communications by a base station (BS), the method comprising: transmitting, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE; transmitting, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH; and for each carrier of the group of carriers, one or more of transmitting over a physical downlink shared channel (PDSCH) or receiving over a physical uplink shared channel (PUSCH) utilizing time-domain resources corresponding to at least one offset value of the one or more offset values that are greater than or equal to a minimum offset value of the corresponding carrier.

Embodiment 30: A base station (BS) configured for scheduling wireless communications, the BS comprising: a memory; and a processor communicatively coupled to the memory, the processor and the memory configured to: transmit, to a user equipment (UE), a time-domain configuration comprising one or more offset values of time-domain resources relative to reception of physical downlink control channel (PDCCH) by the UE, each of the one or more offset values indicating a scheduling offset indicative of a number of slots offset from the reception of the PDCCH by the UE; transmit, to the UE, a scheduling adaptation configuration, the scheduling adaptation configuration comprising one or more minimum offset values relative to reception of the PDCCH, the one or more minimum offset values corresponding to a group of carriers, each of the one or more minimum offset values corresponding to one or more carriers of the group of carriers and indicating a minimum scheduling offset indicative of a minimum number of slots offset from the reception of PDCCH; and for each carrier of the group of carriers, one or more of transmit over a physical downlink shared channel (PDSCH) or receive over a physical uplink shared channel (PUSCH) utilizing time-domain resources corresponding to at least one offset value of the one or more offset values that are greater than or equal to a minimum offset value of the corresponding carrier.

Embodiment 31: A user equipment (UE) comprising one or more means for performing the method of any of Embodiments 1-18.

Embodiment 32: A base station (BS) comprising one or more means for performing the method of any of Embodiments 19-28.

Embodiment 33: A non-transitory computer-readable storage medium having instructions stored thereon for performing the method of any of Embodiments 1-18 for wireless communication by a user equipment (UE).

Embodiment 34: A non-transitory computer-readable storage medium having instructions stored thereon for performing the method of any of Embodiments 19-28 for wireless communication by a base station (BS).

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 11 and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for scheduling wireless communications by a user equipment (UE), the method comprising:
 receiving a time-domain configuration comprising a plurality of offset values, each of the plurality of offset values indicating a scheduling offset for time-domain resources, the scheduling offset indicative of a number of slots offset from reception of physical downlink control channel (PDCCH), the UE being configured with a scheduling adaptation configuration comprising a plurality of sets of minimum offset values, wherein each of the plurality of sets comprises a corresponding minimum offset value for each carrier in a group of carriers comprising a plurality of carriers, the scheduling adaptation configuration comprising one or more minimum offset values relative to reception of the PDCCH, the one or more minimum offset values corresponding to a group of carriers;
receiving, via a single downlink control information (DCI), an indication of a first set of minimum offset values of the plurality of sets of minimum offset values;
for each carrier of the group of carriers, determining at least one offset value of the plurality of offset values is greater than or equal to the minimum offset value of the corresponding carrier in the first set; and
for each carrier of the group of carriers, one or more of transmitting over a physical uplink shared channel (PUSCH) or monitoring a physical downlink shared channel (PDSCH) utilizing time-domain resources corresponding to the at least one offset value greater than or equal to the minimum offset value of the corresponding carrier in the first set.

2. The method of claim 1, further comprising receiving information indicative of carriers that form the group of carriers from a base station (BS).

3. The method of claim 1, wherein the group of carriers comprise one or more of:
carriers that share the same numerology or carriers that are in the same frequency band, or
carriers that share the same transceiver component of the UE during wireless communication.

4. The method of claim 1, further comprising transmitting information indicative of carriers that form the group of carriers to a base station (BS).

5. The method of claim 1, wherein:
the UE is configured with a plurality of groups of carriers, and
at least one carrier is in at least two of the plurality of groups of carriers.

6. The method of claim 1, wherein one or more of the time-domain configuration and the scheduling adaptation configuration is received in a radio resource control (RRC) message using Layer 3 signaling, or another DCI or a media access control (MAC) control element (CE) using Layer 1 or Layer 2 signaling.

7. The method of claim 1, further comprising receiving the scheduling adaptation configuration on a carrier of the group of carriers.

8. The method of claim 7, wherein the carrier is an anchor carrier of the group of carriers.

9. The method of claim 1, further comprising receiving the scheduling adaptation configuration, wherein the scheduling adaptation configuration and the time-domain configuration are received separately.

10. The method of claim 1, wherein each carrier of the group of carriers has corresponding scheduled PDCCH monitoring periods, and further comprising:
for each carrier of the group of carriers, determining to monitor a PDCCH during one or more of the corresponding scheduled PDCCH monitoring periods of the carrier based on scheduled PDCCH monitoring periods of a first carrier of the group of carriers.

11. The method of claim 10, wherein, for each carrier of the group of carriers, determining to monitor the PDCCH during the one or more of the corresponding scheduled PDCCH monitoring periods comprises:
refraining from monitoring the PDCCH on any of the corresponding scheduled PDCCH monitoring periods that do not overlap with the scheduled PDCCH monitoring periods of the first carrier.

12. The method of claim 11, wherein refraining from monitoring the PDCCH comprises powering down a transceiver component of the UE.

13. The method of claim 10, wherein, for each carrier of the group of carriers, determining to monitor the PDCCH during the one or more of the corresponding scheduled PDCCH monitoring periods comprises:
refraining from monitoring the PDCCH on any of the corresponding scheduled PDCCH monitoring periods that do not overlap with the scheduled PDCCH monitoring periods of the first carrier and do not overlap with a period for monitoring the PDSCH on at least one other carrier of the group of carriers.

14. The method of claim 1, wherein each carrier of the group of carriers has corresponding scheduled PDCCH monitoring periods, and further comprising determining to monitor the PDCCH on each carrier of the group of carriers at the scheduled PDCCH monitoring periods of a first carrier of the group of carriers.

15. The method of claim 1, further comprising:
determining to monitor the PDCCH of each carrier of the group of carriers based on scheduled PDCCH monitoring periods of a first carrier of the group of carriers having a lowest periodicity of scheduled PDCCH monitoring periods among the group of carriers.

16. The method of claim 15, further comprising:
determining to monitor the PDCCH of each carrier of the group of carriers based on a largest configured subcarrier spacing for monitoring PDCCH among the group of carriers.

17. A user equipment (UE) configured for scheduling wireless communications, the UE comprising:
a memory; and
a processor communicatively coupled to the memory, the processor and the memory configured to cause the UE to:
receive a time-domain configuration comprising a plurality of offset values, each of the plurality of offset values indicating a scheduling offset for time-domain resources, the scheduling offset indicative of a number of slots offset from reception of physical downlink control channel (PDCCH), the UE being configured with a scheduling adaptation configuration comprising a plurality of sets of minimum offset values, wherein each of the plurality of sets comprises a corresponding minimum offset value for each carrier in a group of carriers comprising a plurality of carriers;
receive, via a single downlink control information (DCI), an indication of a first set of minimum offset values of the plurality of sets of minimum offset values;
for each carrier of the group of carriers, determine at least one offset value of the plurality of offset values is greater than or equal to the minimum offset value of the corresponding carrier in the first set; and
for each carrier of the group of carriers, one or more of transmit over a physical uplink shared channel (PUSCH) or monitor a physical downlink shared channel (PDSCH) utilizing time-domain resources corresponding to the at least one offset value greater than or equal to the minimum offset value of the corresponding carrier in the first set.

18. The UE of claim 17, wherein the processor and the memory are further configured to cause the UE to receive information indicative of carriers that form the group of carriers from a base station (BS).

19. The UE of claim 17, wherein the group of carriers comprise one or more of:

carriers that share the same numerology or carriers that are in the same frequency band, or carriers that share the same transceiver component of the UE during wireless communication.

20. The UE of claim 17, wherein the processor and the memory are further configured to cause the UE to transmit information indicative of carriers that form the group of carriers to a base station (BS).

21. The UE of claim 17, wherein:
the UE is configured with a plurality of groups of carriers, and
at least one carrier is in at least two of the plurality of groups of carriers.

22. The UE of claim 17, wherein one or more of the time-domain configuration and the scheduling adaptation configuration is received in a radio resource control (RRC) message using Layer 3 signaling, or another DCI or a media access control (MAC) control element (CE) using Layer 1 or Layer 2 signaling.

23. The UE of claim 17, wherein the processor and the memory are further configured to cause the UE to receive the scheduling adaptation configuration on a carrier of the group of carriers.

24. The UE of claim 23, wherein the carrier is an anchor carrier of the group of carriers.

25. The UE of claim 17, wherein the processor and the memory are further configured to cause the UE to receive the scheduling adaptation configuration, wherein the scheduling adaptation configuration and the time-domain configuration are received separately.

26. A method for scheduling wireless communications by a network entity, the method comprising:
sending, to a user equipment (UE), a time-domain configuration comprising a plurality of offset values each of the plurality of offset values indicating a scheduling offset for time-domain resources, the scheduling offset indicative of a number of slots offset from reception of physical downlink control channel (PDCCH) by the UE;
sending, to the UE, a scheduling adaptation configuration comprising a plurality of sets of minimum offset values, wherein each of the plurality of sets comprises a corresponding minimum offset value for each carrier in a group of carriers comprising a plurality of carriers
sending, via a single downlink control information (DCI), an indication of a first set of minimum offset values of the plurality of sets of minimum offset values; and
for each carrier of the group of carriers, one or more of transmitting over a PDSCH or receiving over a physical uplink shared channel (PUSCH) utilizing time-domain resources corresponding to at least one offset value greater than or equal to a minimum offset value of the corresponding carrier in the first set.

27. A network entity configured for scheduling wireless communications, the network entity comprising:
a memory; and
a processor communicatively coupled to the memory, the processor and the memory configured to cause the network entity to:
send, to a user equipment (UE), a time-domain configuration comprising a plurality of offset values, each of the plurality of offset values indicating a scheduling offset for time-domain resources, the scheduling offset indicative of a number of slots offset from reception of physical downlink control channel (PDCCH) by the UE;
send, to the UE, a scheduling adaptation configuration comprising a plurality of sets of minimum offset values, wherein each of the plurality of sets comprises a corresponding minimum offset value for each carrier in a group of carriers comprising a plurality of carriers; and
send, via a single downlink control information (DCI), an indication of a first set of minimum offset values of the plurality of sets of minimum offset values; and
for each carrier of the group of carriers, one or more of transmit over a PDSCH or receive over a physical uplink shared channel (PUSCH) utilizing time-domain resources corresponding to at least one offset value greater than or equal to a minimum offset value of the corresponding carrier in the first set.

* * * * *